(12) United States Patent
Kugler et al.

(10) Patent No.: US 8,429,860 B2
(45) Date of Patent: Apr. 30, 2013

(54) STABILITY BRACING OF A SUPPORT STRUCTURE FOR ELEVATING A BUILDING SURFACE

(75) Inventors: William E. Kugler, Denver, CO (US); Stephen J. Knight, III, Littleton, CO (US)

(73) Assignee: United Construction Products, Inc., Denver, CO (US)

( * ) Notice: Subject to any disclaimer, the term of this patent is extended or adjusted under 35 U.S.C. 154(b) by 0 days.

(21) Appl. No.: 13/094,123

(22) Filed: Apr. 26, 2011

(65) Prior Publication Data

US 2011/0239550 A1 Oct. 6, 2011

Related U.S. Application Data

(63) Continuation-in-part of application No. 12/505,217, filed on Jul. 17, 2009, now Pat. No. 8,181,399.

(51) Int. Cl.
*E04B 9/00* (2006.01)
(52) U.S. Cl.
USPC ....... 52/126.6; 52/126.1; 52/126.4; 52/126.7; 52/263; 403/187; 403/192
(58) Field of Classification Search ........... 52/126.1, 52/126.4, 126.6, 126.7, 220.1, 263; 403/187, 403/192
See application file for complete search history.

(56) References Cited

U.S. PATENT DOCUMENTS

| | | | | |
|---|---|---|---|---|
| 2,294,240 A | * | 8/1942 | Pollman | 52/651.1 |
| 2,830,332 A | * | 4/1958 | Pawlowski | 52/126.6 |
| 3,425,179 A | * | 2/1969 | Haroldson | 52/283 |
| 3,778,175 A | * | 12/1973 | Zimmer | 403/187 |
| 3,867,045 A | * | 2/1975 | Beals | 403/190 |
| 3,923,277 A | * | 12/1975 | Perrault et al. | 248/49 |
| 4,085,557 A | * | 4/1978 | Tharp | 52/263 |
| 4,277,923 A | * | 7/1981 | Rebentisch et al. | 52/126.6 |
| 4,558,544 A | * | 12/1985 | Albrecht et al. | 52/126.6 |
| 4,593,499 A | * | 6/1986 | Kobayashi et al. | 52/126.6 |
| 4,736,555 A | * | 4/1988 | Nagare et al. | 52/126.6 |
| 4,773,196 A | | 9/1988 | Yoshida et al. | |
| 4,780,571 A | * | 10/1988 | Huang | 174/484 |
| 4,841,708 A | * | 6/1989 | Johnston | 52/646 |
| 4,905,437 A | * | 3/1990 | Heather | 52/263 |

(Continued)

OTHER PUBLICATIONS

Bison Deck Supports, Bracing Specifications Brochure (Dec. 2005).

(Continued)

*Primary Examiner* — Brian Glessner
*Assistant Examiner* — Joshua Ihezie
(74) *Attorney, Agent, or Firm* — Marsh Fischmann & Breyfogle LLP

(57) ABSTRACT

A support structure for elevating a building surface above a fixed surface and having stability bracing to provide increased stability to the elevated building surface assembly. The support structure includes a plurality of support pedestals that are disposed in spaced-apart relation on a fixed surface. Stabilizing braces are attached to the central section of adjacent support pedestals to interconnect the support pedestals. The stabilizing braces may attach to the support pedestals using anchoring members that are anchored to the support pedestals. Interconnecting the support pedestals in such a manner creates a stable elevated building surface assembly that can be utilized in unstable environments, such as seismically active geographic areas. The support pedestals can be adjustable-height support pedestals.

37 Claims, 13 Drawing Sheets

U.S. PATENT DOCUMENTS

| | | | | |
|---|---|---|---|---|
| 4,922,670 A * | 5/1990 | Naka et al. | | 52/126.6 |
| 4,982,539 A * | 1/1991 | Hiller | | 52/263 |
| 4,996,804 A * | 3/1991 | Naka et al. | | 52/126.6 |
| 5,116,299 A * | 5/1992 | Kvols | | 403/187 |
| 5,185,972 A * | 2/1993 | Markiewicz | | 52/63 |
| 5,285,613 A * | 2/1994 | Goldsworthy et al. | | 52/648.1 |
| 5,333,423 A * | 8/1994 | Propst | | 52/126.6 |
| 5,389,737 A * | 2/1995 | Kobayashi et al. | | 174/483 |
| 5,398,466 A | 3/1995 | Oyama et al. | | |
| 5,400,554 A * | 3/1995 | Lo | | 52/126.5 |
| 5,467,609 A * | 11/1995 | Feeney | | 62/259.2 |
| 5,479,745 A * | 1/1996 | Kawai et al. | | 52/126.6 |
| 5,588,264 A * | 12/1996 | Buzon | | 52/126.6 |
| 5,680,732 A * | 10/1997 | Skouras | | 52/126.1 |
| 5,716,155 A * | 2/1998 | Yoshida et al. | | 403/187 |
| 5,791,096 A * | 8/1998 | Chen | | 52/126.6 |
| 5,862,635 A | 1/1999 | Linse et al. | | |
| 5,904,009 A * | 5/1999 | Huang | | 52/126.6 |
| 5,946,867 A | 9/1999 | Snider, Jr. et al. | | |
| 6,332,292 B1 * | 12/2001 | Buzon | | 52/126.6 |
| 6,363,685 B1 * | 4/2002 | Kugler | | 52/745.05 |
| 6,370,831 B1 | 4/2002 | Marshall et al. | | |
| 6,442,906 B1 * | 9/2002 | Hwang | | 52/126.6 |
| 6,684,582 B2 | 2/2004 | Peart et al. | | |
| 6,772,564 B2 | 8/2004 | Leon | | |
| 6,857,230 B2 * | 2/2005 | Owen | | 52/126.6 |
| RE39,097 E | 5/2006 | Schilham | | |
| 7,360,343 B1 * | 4/2008 | Spransy et al. | | 52/263 |
| 7,373,759 B1 | 5/2008 | Simmons | | |
| 7,454,869 B2 * | 11/2008 | Owen | | 52/263 |
| 7,509,782 B2 * | 3/2009 | Colosimo et al. | | 52/792.1 |
| 2001/0011441 A1 * | 8/2001 | Jette | | 52/220.1 |
| 2001/0034987 A1 * | 11/2001 | Cooper et al. | | 52/220.8 |
| 2002/0003194 A1 * | 1/2002 | Simmons | | 248/49 |
| 2002/0026757 A1 * | 3/2002 | Scissom et al. | | 52/220.2 |
| 2002/0078638 A1 * | 6/2002 | Huang | | 52/126.6 |
| 2002/0148173 A1 * | 10/2002 | Kugler | | 52/126.6 |
| 2003/0070372 A1 * | 4/2003 | Favero | | 52/220.1 |
| 2004/0035064 A1 * | 2/2004 | Kugler et al. | | 52/126.6 |
| 2004/0055232 A1 * | 3/2004 | Jette | | 52/220.1 |
| 2004/0074170 A1 * | 4/2004 | Huang | | 52/220.1 |
| 2004/0261329 A1 * | 12/2004 | Kugler et al. | | 52/126.6 |
| 2005/0284040 A1 | 12/2005 | Hashimoto et al. | | |
| 2008/0053017 A1 | 3/2008 | Hockemeyer et al. | | |
| 2008/0053018 A1 | 3/2008 | Hockemeyer et al. | | |
| 2008/0105172 A1 | 5/2008 | Repasky | | |
| 2008/0222973 A1 * | 9/2008 | Lee et al. | | 52/126.1 |
| 2009/0183442 A1 * | 7/2009 | Repasky | | 52/126.6 |
| 2009/0188189 A1 * | 7/2009 | Repasky | | 52/291 |
| 2011/0011012 A1 | 1/2011 | Knight, III et al. | | |
| 2011/0023385 A1 | 2/2011 | Knight, III et al. | | |

OTHER PUBLICATIONS

Bison Deck Supports, Bracing Specifications and Design Requirements Brochure (2003).

Bison Deck Supports, Banded Bracing Specification Brochure (Feb. 2006).

Bison ScrewJack Specification Brochure (2003).

* cited by examiner

STABILITY BRACING OF A SUPPORT STRUCTURE FOR ELEVATING A BUILDING SURFACE

CROSS-REFERENCE TO RELATED APPLICATIONS

This application claims priority as a continuation-in-part application of U.S. patent application Ser. No. 12/505,217 filed on Jul. 17, 2009, and now U.S. Pat. No. 8,181,399, which is incorporated herein by reference in its entirety.

BACKGROUND OF THE INVENTION

1. Field of the Invention

This invention relates to the field of support structures for supporting an elevated surface above a fixed surface, such as for elevated floors, decks and walkways.

2. Description of Related Art

Elevated building surfaces such as elevated floors, decks, terraces and walkways are desirable in many environments. One common system for creating such surfaces includes a plurality of surface tiles, such as concrete tiles (e.g., pavers), stone tiles or wood tiles, and a plurality of spaced-apart support pedestals upon which the tiles are placed to be supported above a fixed surface. For example, in outdoor applications, the surface may be elevated above a fixed surface by the support pedestals to promote drainage, to provide a level structural surface for walking, and/or to prevent deterioration of or damage to the surface tiles. The pedestals can have a fixed height, or can have an adjustable height such as to accommodate variations in the contour of the fixed surface upon which the pedestals are placed, or to create desirable architectural features.

Although a variety of shapes are possible, in many applications the surface tiles are generally rectangular in shape, having four corners. In the case of a rectangular-shaped tile, each of the spaced-apart support pedestals can support four adjacent surface tiles at the tile corners. Stated another way, each rectangular surface tile can be supported by four pedestals that are disposed under each of the corners of the tile. Large or heavy tiles can be supported by additional pedestals at positions other than at the corners of the tiles.

One example of a support pedestal is disclosed in U.S. Pat. No. 5,588,264 by Buzon, which is incorporated herein by reference in its entirety. The support pedestal disclosed by Buzon can be used in outdoor or indoor environments and is capable of supporting heavy loads applied by many types of building surfaces. The support pedestal generally includes a threaded base member and a threaded support member that is threadably engaged with the base member to enable the height of the support pedestal to be adjusted by rotating the support member or the base member relative to the other. The support pedestal can also include a coupling or coupler member disposed between the base member and the support member for further increasing the height of the pedestal, if necessary. Alternatively, the support pedestal and/or coupler member may be in the form of a pipe or box-shaped support that may be cut to the desired length.

Support pedestals are also disclosed in U.S. Pat. No. 6,363,685 by Kugler and U.S. Patent Application Pub. No. 2004/0261329 by Kugler et al., each of which is also incorporated herein by reference in its entirety.

SUMMARY OF THE INVENTION

One problem that is associated with some support structures for elevated surfaces is that the support structures do not provide adequate structural stability in certain unstable environments. As a result, the support structures need to be stabilized to be utilized in certain seismically active geographic areas or other locations that may be subject to disruptive vibrations of the underlying fixed surface. This can be a particular problem when the support pedestals themselves are not affixed to the underlying surface (e.g., using bolts or fasteners) and therefore under some circumstances do not move in unison with movement of the underlying surface.

Another problem associated with some support structures for elevated surfaces is that the safely obtainable height of the support pedestals is limited due to the increasing instability of the support pedestals as the height of the pedestals and the slenderness ratio are increased, e.g., through the use of coupling members to increase the support pedestal height. The increased height of the center of gravity further compounds the problems associated with disruptive vibrations of the underlying surface.

It is therefore an objective to provide a support structure for an elevated surface, where the support structure has improved structural stability. It is also an objective to provide a support structure that can enable the safe construction of an elevated surface having an increased height above the fixed surface as compared to existing support structures, particularly in geographic areas that are prone to disruptive vibrations.

In one embodiment, a support structure for elevating a building surface above a fixed surface is provided. The support structure includes a plurality of support pedestals disposed in spaced-apart relation, the support pedestals having a base plate that is adapted to be placed on the fixed surface, a support plate that is adapted to support a building surface component (e.g., a tile), and a central section extending between the base plate and the support plate. At least a first anchor engagement element is disposed on the central sections of the support pedestals. The support structure also includes a plurality of anchoring members that are engaged with the first anchor engagement elements of the support pedestals to anchor the anchoring members to the support pedestals. Additionally, at least one stabilizing brace is operatively attached to at least first and second adjacent support pedestals. In this regard, a first end of the stabilizing brace is secured to a first anchoring member anchored to the first support pedestal, and a second end of the stabilizing brace is secured to a second anchoring member anchored to the second support pedestal to operatively interconnect the first support pedestal to the second support pedestal. Additional stabilizing braces may be used to operatively interconnect the first and second support pedestals to additional support pedestals to further stabilize the support structure.

In one aspect, the anchoring members may include a mounting member having first and second ends defining an anchoring member gap therebetween. This mounting members may be subject to a number of characterizations. In one characterization, the mounting members may be resilient, e.g., resiliently movable between first and second states. In this regard, the mounting members may be compressively engaged and mounted on the central sections of the support pedestals at any appropriate location. In other characterizations, the mounting members may be curvilinear, an inner surface of the mounting members may contact the central sections of the support pedestals, and/or the central sections of the support pedestals may be disposed within the anchoring member gaps. In one variation, the mounting members may be resiliently movable between at least first and second states, the anchoring member gaps being greater in the second state than in the first state and the anchoring members being detachable from the central sections in the second state. In yet another aspect, the anchoring members may be mechanically fastened to the central sections of the support pedestals.

In another aspect, the anchoring members may include at least a first attachment element (e.g., lug, projection) that is operatively engaged with the first anchor engagement element (e.g., aperture, bore) on a central section of the support pedestals. In some arrangements, the anchoring members may include a second attachment element that is engaged with a second anchor engagement element disposed on the central sections of the support pedestals. For instance, the first and second anchor engagement elements may be disposed on the central sections and may be separated by about 45° or more, such as by about 90° or more, along a circumference of the central sections, although numerous other orientations are also contemplated. In another arrangement, the support pedestals may further include at least third and fourth anchor engagement elements disposed on the central sections of the support pedestals. In this arrangement, the first and second anchor engagement elements may be disposed at a first vertical position above the base plates and the third and fourth anchor engagement elements may be disposed at a second vertical position above the base plates that is different than the first vertical position. This arrangement may allow first and second anchoring members to be attached to the central section of a pedestal to enable the attachment of stabilizing braces at different heights (e.g., vertical positions) to the central sections of the pedestals and to enable stabilizing braces to be attached to the support pedestals at different positions along the circumference of the central sections.

In another aspect, the anchoring members may further include at least a first brace engagement element (and/or additional brace engagement elements) that is adapted to engage (e.g., removably, permanently) with the first or second end of the stabilizing brace. As an example, the brace engagement elements may include a tab extending outwardly from the anchoring members. The tabs may include a cavity that is adapted to receive (e.g., telescopically) the first or second end of the stabilizing brace. To removably lock or otherwise secure the stabilizing brace to an anchoring member, an end of the stabilizing brace may have a spring-loaded locking element that is adapted to be received in an aperture on the tab. For instance, a user may insert a tool (e.g., screwdriver) into the aperture to displace the locking element from the aperture and permit removal of the stabilizing brace from the tab. In another aspect, the ends of the stabilizing brace may be secured to the anchoring members using an adhesive or a mechanical fastener (e.g., a threaded fastener).

The stabilizing brace may be subject to a number of characterizations. In one characterization, the stabilizing brace may have an adjustable length. For instance, the stabilizing brace may include at least first and second telescoping members that may be removably locked in position relative to each other (e.g., via a pin being extended through aligned apertures in the first and second telescoping members). However, fixed length stabilizing braces may also be utilized as part of the structure, alone or in combination with adjustable stabilizing braces. In another characterization, the stabilizing brace may be constructed of any appropriate material (e.g., plastic, metal, and/or composites). Additionally, the stabilizing braces interconnecting adjacent support pedestals may in one characterization be disposed generally horizontally relative to the fixed surface (i.e., generally parallel to the fixed surface), although other orientations are also envisioned being used with the system.

The support pedestals may also be subject to a number of characterizations. In one characterization, the central sections include a base member extension extending away from the base plates, and a support member extension extending away from the support plates that is operatively attached to the base member extension. For instance, the base and support member extensions may be cylindrical and may be threadably attached, telescopically translatable, etc. Further, the central sections may include one or more coupling members extending between the base member extensions and the support member extensions that operatively attach the base member extensions to the support member extensions. The coupling members may also be cylindrical and may be attached in any appropriate manner (e.g., threaded interconnection, telescoping interconnection). It should be appreciated that the support pedestals are not limited to cylindrically shaped support pedestals; support pedestals of other cross-sectional shapes are also encompassed by the present disclosure. Further, the support pedestals may be constructed of any appropriate materials (e.g., plastic, metal, composites) and of any appropriate dimensions. For example, a distance between the base plate and the support plate may be at least about two inches, at least about 12 inches or at least about 18 inches.

In another embodiment, a support structure for elevating a building surface above a fixed surface is disclosed. The structure may include a plurality of support pedestals disposed in spaced-apart relation on the fixed surface that include a base plate, a support plate, a central section extending between the base and support plates, and a plurality of apertures disposed on the central sections. The structure also includes a plurality of anchoring members that are removably anchored to the apertures on the central sections of the support pedestals, and a stabilizing brace operatively attached to first and second of the plurality of support pedestals. A first end of the stabilizing brace is secured to a first anchoring member anchored to the first support pedestal and a second end of the stabilizing brace is secured to a second anchoring member anchored to the second support pedestal.

In one aspect, the plurality of apertures may include at least a first aperture and a second aperture that are disposed at substantially the same vertical position above the base plates and are separated by about 45° or more along the circumference of the central sections, such as by about 90° or more. In another aspect, the plurality of apertures may include at least a first aperture that is disposed at a first vertical position above the base plates and at least a second aperture that is disposed at a second vertical position above the base plates that is different that the first vertical position. For example, the first and second anchoring members may be anchored to the first support pedestal and the second support pedestal respectively at a first vertical position above the base plates. Third and fourth anchoring members may be anchored to the first support pedestal and the second support pedestal respectively at a second vertical position above the base plates that is different than the first vertical position. A first end of the second stabilizing brace may be operatively attached to the first anchoring member anchored to the first support pedestal, and a second end of the second stabilizing brace may be operatively attached to an anchoring member anchored to a third support pedestal.

In another aspect, the central sections of the plurality of support pedestals include a base member extension extending away from the base plate and a support member extension extending away from the support plate that is operatively attached to the base member extension. The central sections of the plurality of support pedestals may also include one or more coupling members operatively attaching the base member extensions and the support member extensions. In this regard, the first and second anchoring members may be anchored to the coupling members of the first and second support pedestals respectively. In one characterization, the base member extension, the support member extension and the coupling member may each be cylindrical.

In another aspect, the anchoring members may be compressively engaged and mounted on the central sections of the support pedestals. For example, the anchoring members may include a resilient mounting member having first and second ends defining an anchoring member gap therebetween, where the central sections are disposed in the anchoring member gaps. In another aspect, the anchoring members may be mechanically fastened to the central sections of the support pedestals. In another aspect, the stabilizing brace may be secured to the anchoring member using a mechanical fastener and/or adhesive (e.g., an epoxy).

In another embodiment, an elevated building surface assembly is disclosed. The assembly includes a plurality of support pedestals disposed in spaced-apart relation on a fixed surface, where the support pedestals include a base plate, a support plate, and a central section extending generally perpendicularly from the base and support plates. The assembly also includes a plurality of stabilizing braces operatively attached to and interconnecting adjacent support pedestals, wherein first and second ends (e.g., distal and proximal ends) of the stabilizing braces are attached to the central sections of the adjacent support pedestals. The stabilizing braces may be disposed generally horizontally relative to the fixed surface. A plurality of building surface components (e.g., surface tiles) is operatively disposed on the support plates of the support pedestals.

In one characterization, a plurality of anchoring members may be anchored to the central sections of the adjacent support pedestals, wherein first and second ends of the stabilizing braces are attached to the anchoring members to interconnect adjacent support pedestals. For example, the anchoring members may be removably attached to the central sections of the adjacent support pedestals. The anchoring members may include a mounting member having first and second ends defining an anchoring member gap therebetween, wherein the central sections of the support pedestals are disposed within the anchoring member gaps. The anchoring members may also include at least a first attachment element that is operatively engaged with a first anchor engagement element on the central sections of the support pedestals. In this regard, the anchoring members may also include at least a second attachment element that is engaged with a second anchor engagement element disposed on the central sections to anchor the anchoring members to the support pedestals. For example, the anchor engagement elements may comprise apertures, and the first and second attachment elements may include lugs that are adapted to be received in the anchor engagement apertures. In one aspect, at least third and fourth anchor engagement elements are disposed on the central sections, wherein the first and second anchor engagement elements are disposed at a first vertical position above the base plates and the third and fourth anchor engagement elements are disposed at a second vertical position above the base plates that is different than the first vertical position. The anchoring members may also include a first brace engagement element, where the first brace engagement elements are adapted to engage with a first and/or second end of the stabilizing braces. For example, the anchoring members may include a second brace engagement element, wherein the second brace engagement elements are adapted to engage with the first and/or second end of the stabilizing braces. In this regard, the first brace engagement elements may include a tab extending outwardly from the anchoring members.

The central sections of the support pedestals may include a base member extension extending away from the base plates, and a support member extension extending away from the support plates, wherein the support member extensions are operatively attached to the base member extensions. The central sections may also include a coupling member extending between the base member extensions and the support member extensions, wherein the coupling members operatively attach the base member extensions to the support member extensions. In one aspect, the base member extension, the support member extension and the coupling member are cylindrical. The support pedestals may comprise plastic to resist degradation or corrosion in an exterior environment.

The stabilizing braces may have an adjustable length or may have a fixed length. Further, the stabilizing braces may include a material selected from the group consisting of plastic, metal and composites. Further, the building surface components may include surface tiles. For example, the surface tiles may be selected from the group consisting of slate tiles, natural stone tiles, composite tiles, concrete tiles and wooden tiles.

Some embodiments disclosed herein provide various methodologies for constructing elevated building surface assemblies. In one embodiment, a method for constructing an elevated building surface includes locating a plurality of support pedestals including support pillars on a fixed surface in spaced-apart relation, installing anchoring members on the support pillars of the support pedestals, attaching a stabilizing brace to the anchoring members of adjacent support pedestals to operatively interconnect the adjacent support pedestals, and placing building surface components on the support pedestals to form a stabilized elevated building surface assembly.

In one characterization, the attaching step may include attaching first and second ends of the stabilizing brace to the anchoring members of the adjacent support pedestals using a mechanical fastener. In another characterization, the installing step may include compressively mounting the anchoring members onto the support pillars of the support pedestals. The installing step may also include inserting a lug disposed on an inner surface of the anchoring members into an anchor engagement aperture on the support pillars of the support pedestals. In this regard, the inserting step may include inserting first and second opposing lugs disposed on the anchoring members into anchor engagement apertures on the support pillars of the support pedestals.

In another aspect, the attaching step may include attaching a first stabilizing brace at a first vertical position along the length of the support pillar of the adjacent support pedestals and attaching the second stabilizing brace at a second vertical position along the length of the support pillar to interconnect adjacent support pedestals, wherein the second vertical position is different than the first vertical position.

The support pedestals may include a base plate that is placed on the fixed surface, and a support plate that supports the building surface components, wherein the support pillar extends generally perpendicularly from the base and support plates. The building surface components may include surface tiles, such as surface tiles selected from the group consisting of slate tiles, natural stone tiles, composite tiles, concrete tiles and wood tiles.

In accordance with the foregoing embodiments and aspects, the support structure can provide increased structural stability. In one aspect, the support structure can be used to support elevated surfaces in seismically active geographic areas. Through interconnection of the support pedestals using stabilizing braces attached to a central section of the support pedestals, the support pedestals can move in unison during a seismic event or other disruption to maintain the desired spacing between the support pedestals, and therefore continue to safely support surface tiles placed on the support pedestals and maintain the integrity of the building surface. The stabilizing braces may be rapidly and easily attached to the support pedestals during construction of the support structure.

The support structure can have an increased structural stability, thereby enabling the use of support pedestals having an increased height without adversely affecting the stability of the elevated surface. For example, the support pedestals can have a height of greater than 12 inches, such as at least about 24 inches and even up to about 36 inches or more.

DESCRIPTION OF THE INVENTION

Figure 1:
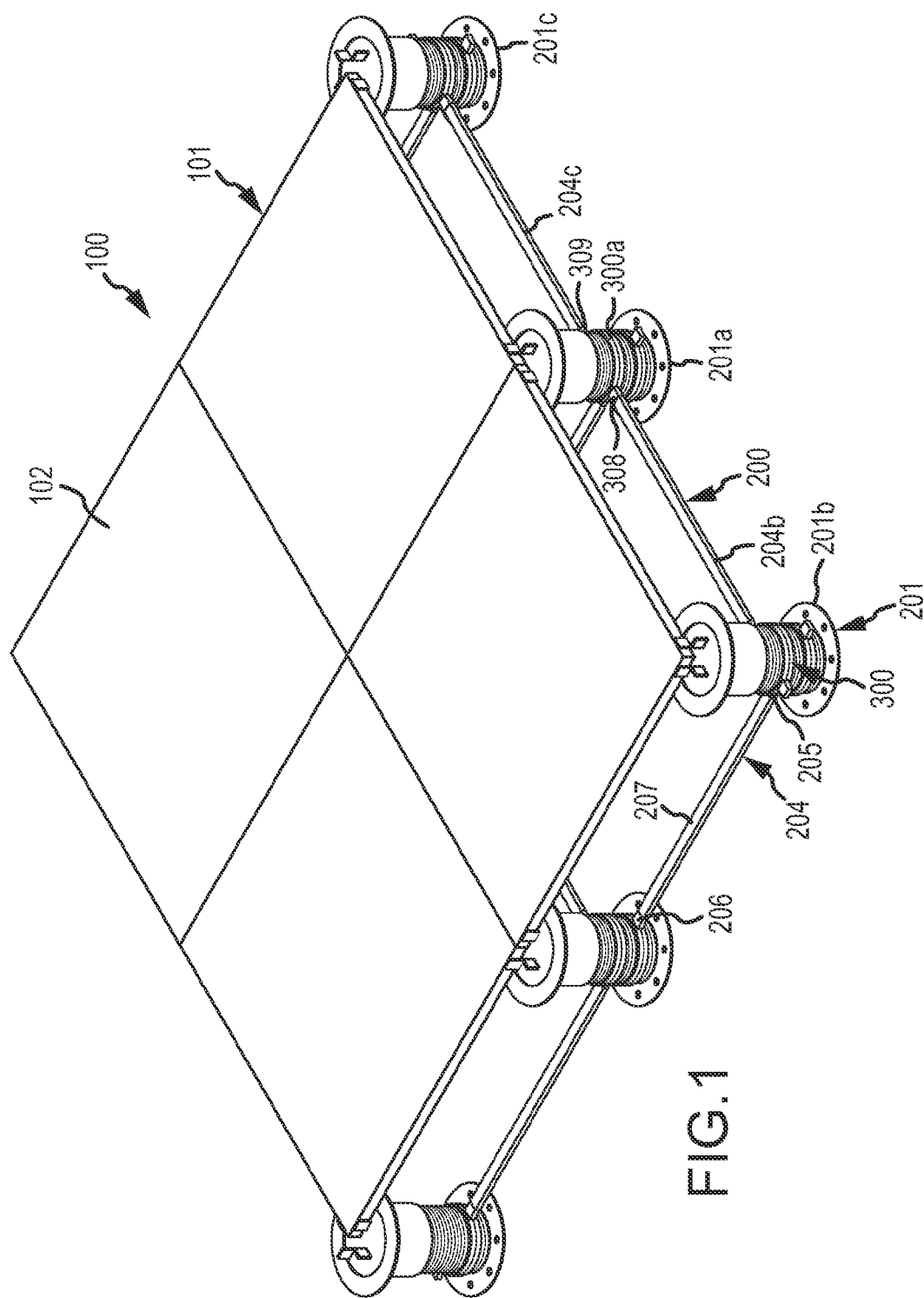
FIG. 1 illustrates a perspective view of a stabilized elevated building surface assembly.

FIG. 1 illustrates a portion of an elevated building surface assembly 100 that includes a building surface 101 formed from a plurality of building surface components such as surface tiles 102 that are elevated above a fixed surface by a support structure 200. The support structure 200 includes a plurality of spaced-apart support pedestals 201 and a plurality of stabilizing braces 204 having first and second ends 205, 206 that interconnect the support pedestals 201. Additionally, a plurality of anchoring members 300 are anchored (e.g., removably) to the support pedestals 201 to secure the stabilizing braces 204 to the support pedestals 201. The anchoring members 300 will be discussed in more detail in relation to FIGS. 3a-6b.

The surface tiles 102 can be comprised of virtually any material from which a building surface is constructed. Examples include, but are not limited to, slate tiles, natural stone tiles, composite tiles, concrete tiles (e.g., pavers), wooden deck tiles, including hardwood deck tiles, tiles of metal or fiberglass grating, rubber tiles and the like. The support pedestals 201 can be placed in a spaced-apart relation on fixed surfaces including, but not limited to, rooftops, on-grade (e.g., natural ground), over concrete slabs including cracked concrete slabs, and can be placed within fountains and water features, used for equipment mounts, and the like. The elevated building surface assembly 100 can be used for both interior and exterior applications.

Each of the surface tiles 102 is placed upon several support pedestals 201 to elevate the surface tile 102 above the fixed surface. As illustrated in FIG. 1, the surface tiles 102 are rectangular (e.g., square) and a support pedestal 201 may be disposed beneath four corners of adjacent surface tiles 102. Further, although illustrated in FIG. 1 as being laid out in a symmetric square pattern, the support pedestals 201 can also be laid out in various configurations as may be dictated by the shape and size of the surface tiles, such as a rectangular configuration or a triangular configuration.

The support pedestals 201 are interconnected by a plurality of stabilizing braces 204 that are secured to the support pedestals 201 via the anchoring members 300, and operatively interconnect each support pedestal 201 with one or more adjacent support pedestals 201 to form a stable support structure 200. The stabilizing braces 204 interconnecting the support pedestals 201 by attachment to central sections of the support pedestals can advantageously enhance the stability of the support structure 200 as compared to a structure utilizing support pedestals that are not interconnected and are thus free to move independently with respect to other support pedestals. For example, if one or more of the support pedestals 201 shift, such as during a seismic event or other disruption, the stabilizing braces 204 may cause the interconnected support pedestals 201 to move essentially in unison such that the spacing between adjacent support pedestals may remain substantially fixed. Therefore, the surface tiles 102 may remain supported above the fixed surface and the integrity of the building surface 101 may be maintained. It is a particular advantage that the structural integrity of the building surface 101 can be maintained, even when neither the stabilizing braces 204 nor the support pedestals 201 are attached to the fixed surface.

Figure 2:
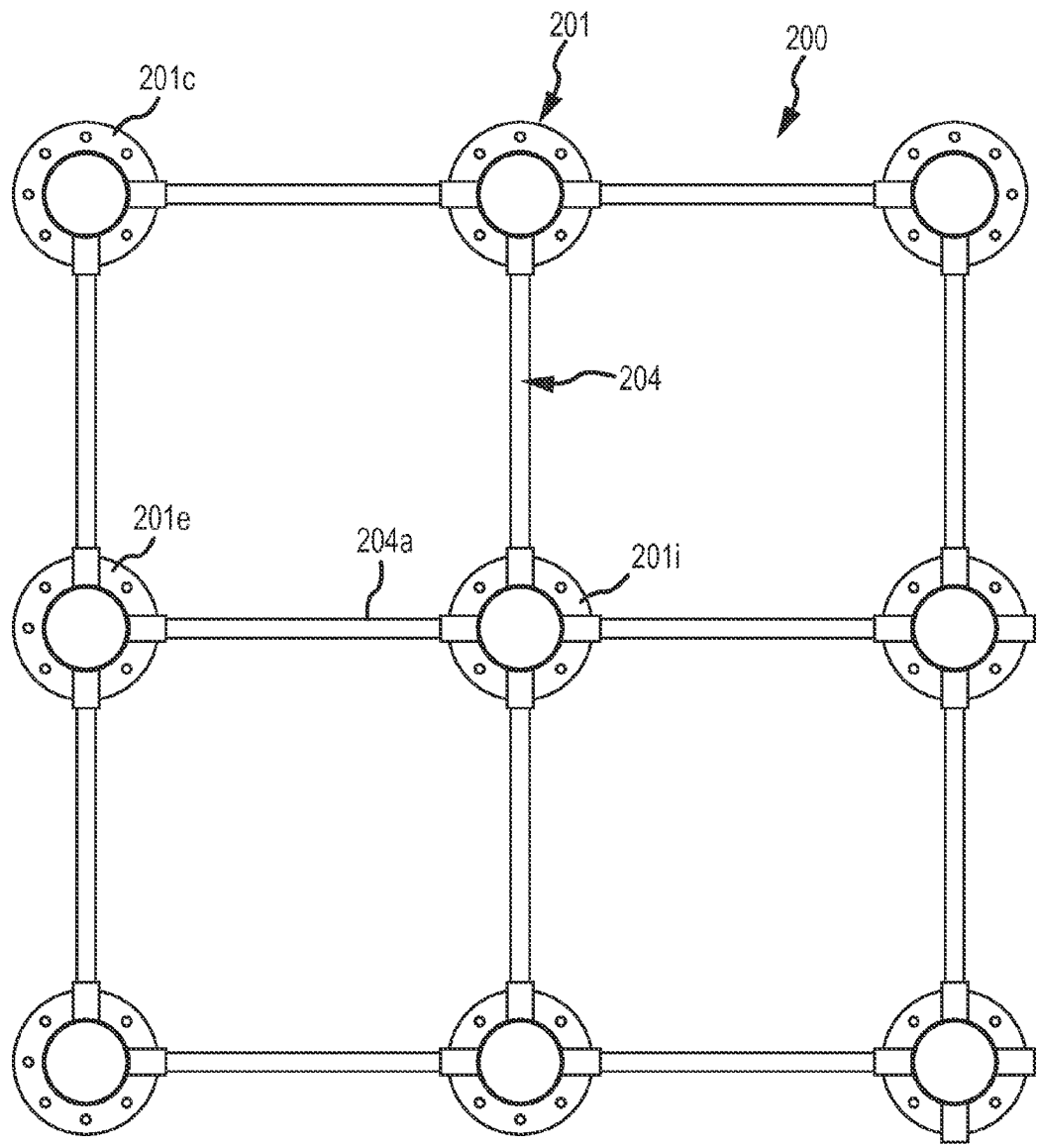
FIG. 2 illustrates a top view of a stable support structure for elevating a surface.

FIG. 2 illustrates a top view of a support structure 200 for elevating a building surface. The support structure 200 includes a plurality of support pedestals 201 that are disposed in spaced-apart relation by a predetermined distance. The placement of the support pedestals 201 will generally be dictated by the shape and size of the surface tiles that are placed on the support structure 200. By way of example, the distance between adjacent support pedestals, such as pedestals 201e and 201i, can typically be from about 1 foot to about 3 feet, such as about 2 feet. As discussed below, the stabilizing braces 204 can optionally have an adjustable length, such as to accommodate the use of surface tiles having edges of different lengths As is illustrated in FIG. 2, a plurality of stabilizing braces 204 are attached to and interconnect the support pedestals 201. For example, each stabilizing brace 204 can operatively interconnect two adjacent support pedestals 201. As illustrated in FIG. 2, each interior support pedestal, such as support pedestal 201i, may be connected by a stabilizing brace 204 to each nearest adjacent support pedestal. Thus, the interior support pedestal 201i may be interconnected to four nearest adjacent support pedestals using four individual stabilizing braces 204. Exterior support pedestals located on the perimeter of the support structure 200 may be attached to fewer than four support pedestals, such as support pedestal 201e, which may be interconnected to three adjacent support pedestals. In a similar fashion, corner support pedestals such as support pedestal 201c may be interconnected to two adjacent support pedestals. Although FIG. 2 illustrates that stabilizing braces 204 are disposed between and interconnected to nearest adjacent support pedestals, the braces 204 may also be disposed to interconnect adjacent support pedestals that are diagonally opposed, such as corner support pedestal 201c and interior support pedestal 201i.

The support structure 200 comprising the support pedestals 201 interconnected with stabilizing braces 204 can advantageously provide enhanced stability for the elevated building surface. For example, the support structure 200 can be used in seismically active geographic areas to improve the stability of the elevated building surface during seismic events. In this regard, the stabilizing braces 204 can cause the support pedestals 201 to move essentially in unison during movement of the fixed surface, thereby maintaining the required spaced-apart relationship between support pedestals to keep the surface tiles supported. Such a stable structure may also be desired in other locations that are subject to periodic vibrations, such as a train platform.

The utilization of stabilizing braces 204 to interconnect the support pedestals 201 in the manner described herein may also increase the safely obtainable height of the support pedestals 201. That is, the stabilizing braces 204 can provide sufficient structural stability such that support pedestals 201 having a higher center of gravity can be utilized to elevate the building surface while reducing the risk of the building surface collapsing. It is also an advantage that the stabilizing braces 204 may be attached to the support pedestals 201 on the central section of the support pedestals, e.g., nearer the center of gravity of the support pedestals 204, as opposed to being attached to the support plate and/or the base plate of the support pedestals 204.

The stabilizing braces 204 are therefore adapted to interconnect the support pedestals 201 and provide a sufficiently rigid lateral connection between the support pedestals 201 such that the support pedestals 201 may move in unison, and such that the spacing among the support pedestals 201 does not substantially change due to seismic events or other events that can cause movement of the support pedestals 201.

Figure 3A:
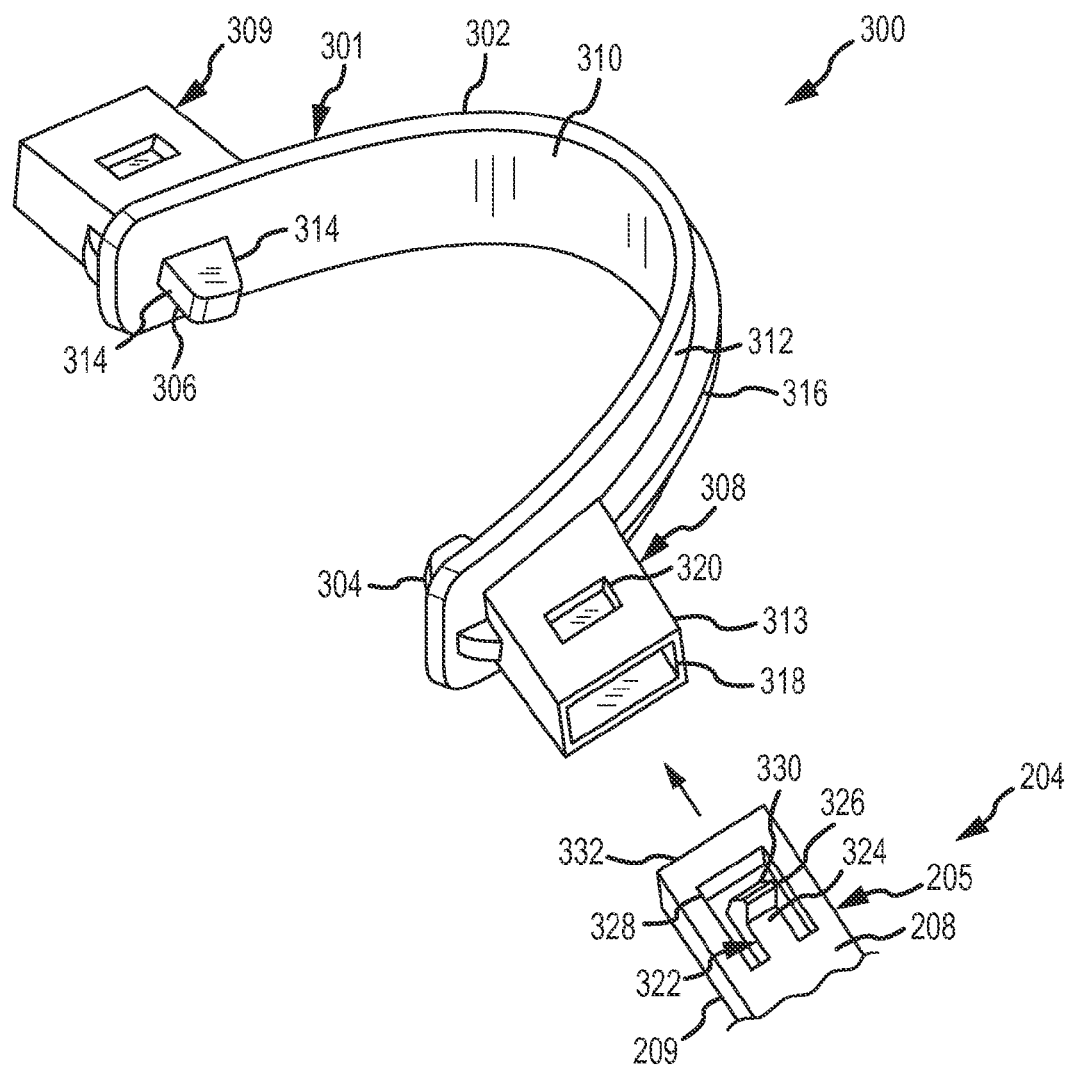
FIG. 3a illustrates an anchoring member that is adapted to interconnect stabilizing braces between support pedestals in a support structure for elevating a surface, and showing a first end of a stabilizing brace being separated from the anchoring member.

As noted above with respect to FIG. 1, anchoring members may be anchored to the support pedestals to facilitate attachment of the stabilizing braces to the support pedestals. Turning now to FIG. 3a, an example of an anchoring member 300 is illustrated that may be used as part of the support structure 200 in FIGS. 1-2 to attach the stabilizing braces 204 to the support pedestals 201. Stated otherwise, the anchoring member 300 allows one or more stabilizing braces 204 to be operatively attached to a support pedestal 201. The anchoring member 300 may comprise a resilient mounting member that may be quickly mounted (e.g., compressively) onto a support pillar of a support pedestal 201 (e.g., onto a central section 230 illustrated in FIG. 5, discussed below) and that allows one or more stabilizing braces 204 to be quickly mounted and attached to the anchoring member 300 (e.g., via insertion).

As illustrated in FIG. 3a, the anchoring member 300 may broadly include a mounting member 301 for mounting onto a central section of a support pedestal. For instance, the mounting member 301 may be a generally flexible or otherwise resilient member that may be mounted (e.g., in compression) on the central section of a support pedestal. The mounting member 301 may be in the form of a curvilinear member 302 but also may be in the form of non-curvilinear members such as square-shaped members, partially hexagonal members, and the like. In some arrangements, the mounting member 301 may be appropriately mechanically fixed (e.g., mechanically fastened) to the central section of a support pedestal (e.g., via threaded fasteners and holes) whether or not the mounting member 301 is resilient. In any event, the anchoring member 300 may also include at least one attachment element adapted for engagement with an anchor engagement element (e.g., anchor engagement element 232 of FIGS. 5-7) on a support pedestal. For instance, the anchoring member 300 may include first and second opposing attachment elements 304, 306 for respective engagement with a pair of anchor engagement elements disposed on the central section of the support pedestal 201.

As will be appreciated below in relation to FIGS. 6a-6b, the mounting member 301 may be adapted to deflect away from an initial position or state and then maintain a state of compression when anchored to a support pedestal. For instance, the curvilinear member 302 may be in the form of an arcuate member including an inside surface 310 that is adapted to face the central section of a support pedestal 201 and an outside surface 312 that is generally configured to face away from the central section when the anchoring member 300 is attached to a support pedestal.

The inside surface 310 may be generally smooth which allows the curvilinear member 302 to better conform to a central section (e.g., a cylindrical central section) of a support pedestal, although in some variations the inside surface 310 may include any appropriate structure (e.g., protrusions, teeth) that may serve to enhance the grip of the anchoring member 300 on a support pedestal. In any case, the inside surface 310 may also include the first and second opposing attachment elements 304, 306 which may be sized and configured for engagement with a pair of anchor engagement elements, such as the anchor engagement elements 232 on the central section of the support pedestal 201 shown in FIGS. 5-7. The first and second opposing attachment elements 304, 306 may be generally opposed from each other (e.g., separated by about 180°), although other orientations are also envisioned. Each of the first and second opposing attachment elements 304, 306 may be in the form of a protrusion (e.g., a lug) that is adapted for receipt in and/or introduction or insertion into a corresponding aperture in the central section of the support pedestal 201.

As shown, the first and second opposing attachment elements 304, 306 may include a plurality of converging side walls 314 (e.g., the side walls converge in a direction from the inside surface 310 towards a center of the curvilinear member 302) which facilitate insertion of the first and second opposing attachment elements 304, 306 into anchor engagement apertures in the support pedestal 201. In other variations, each of the first and second opposing attachment elements 304, 306 may be in the form of an aperture that is sized for receipt of a protrusion on the central section of a support pedestal. Engagement of the first and second opposing attachment elements 304, 306 and the central section of a support pedestal will be shown and discussed in more detail in relation to FIGS. 6a-7.

The outside surface 312 of the curvilinear member 302 may include one or more stiffening ribs 316 disposed thereon which may serve to enhance the structural integrity of the anchoring member 300. Additionally, at least one brace engagement element may be disposed on the outside surface 312 that is adapted to engage with the first or second end 205, 206 of the brace 204. For instance, the outside surface 312 may include first and second brace engagement elements 308, 309 that allow a support pedestal to be interconnected to at least two adjacent support pedestals. Turning back to FIG. 1, a first brace engagement element 308 of a first anchoring member 300a allows a first support pedestal 201a to be interconnected to a second support pedestal 201b via a stabilizing brace 204b, and a second brace engagement element 309 allows the first support pedestal 201a to also be interconnected to a third support pedestal 201c via another stabilizing brace 204c, the second and third support pedestals 201b, 201c being situated approximately 180° to each other in relation to the first support pedestal 201a. This will be further discussed below in relation to FIGS. 6a-6b.

With reference again to FIG. 3a, the first brace engagement element 308 (similar discussion may apply equally to the second brace engagement element 309) may be in the form of a tab 313 that extends outwardly from the curvilinear member 302. The tab 313 may include a cavity 318 that is sized for receipt of the first end 205 of the stabilizing brace 204. For instance, the cavity 318 may have internal dimensions that are approximately equal to or slightly greater than the external dimensions of an end 205 of the stabilizing brace 204. This allows the end 205 of the stabilizing brace 204 to be inserted into the cavity 318 such that a slight friction fit may be achieved. The first brace engagement element 308 may also include at least one aperture 320 which is sized for receipt of a spring-loaded locking element or member 322 disposed adjacent an end 205 of the stabilizing brace 204 which is discussed in more detail below.

With reference now to FIGS. 1-3a, each stabilizing brace 204 may be in the form of any appropriate elongated reinforcement member and can have a variety of sizes, shapes and configurations. As discussed above, each stabilizing brace 204 may include first and second ends 205, 206, and these may be disposed at opposite ends of an elongate central portion 207. Additionally, the stabilizing brace 204 may include top and bottom surfaces 208, 209 (with the understanding that either of such surfaces could be the "top" or "bottom" surface) such as when the stabilizing braces have a rectangular cross-section. The first and second ends 205, 206 are adapted to be operatively attached to a support pedestal 201 (e.g., via the anchoring member 300), and in this regard may include a locking mechanism such as spring-loaded locking members 322 for engagement with the first and second brace engagement elements 308, 309 of the anchoring member 300. While the spring-loaded locking member 322 will be discussed in relation to the first end 205 of the stabilizing brace 204, similar discussion may also apply to the second end 206 of the stabilizing brace 204.

With particular reference to FIG. 3a, the spring-loaded locking member 322 may be in the form of a resilient arm 324 having a protuberance 326 disposed on one end thereof that is sized for receipt in the at least one aperture 320 of the brace engagement element 308 when the end 205 of the stabilizing brace 204 is inserted into the cavity 318. The resilient arm 324 and protuberance 326 may be disposed within an opening 328 located adjacent the first end 205 of the brace 204 and are designed to be flexibly mounted in the opening 328. That is, upon the resilient arm 324 and protuberance 326 being deflected from the position shown in FIG. 3a (e.g., either upwardly or downwardly), the resilient arm 324 and protuberance 326 may generally return to the position shown in FIG. 3a. This feature may be due to the material of the brace 204 and/or due to any appropriate joint between the resilient arm 324 and the body of the stabilizing brace 204.

Figure 3B:
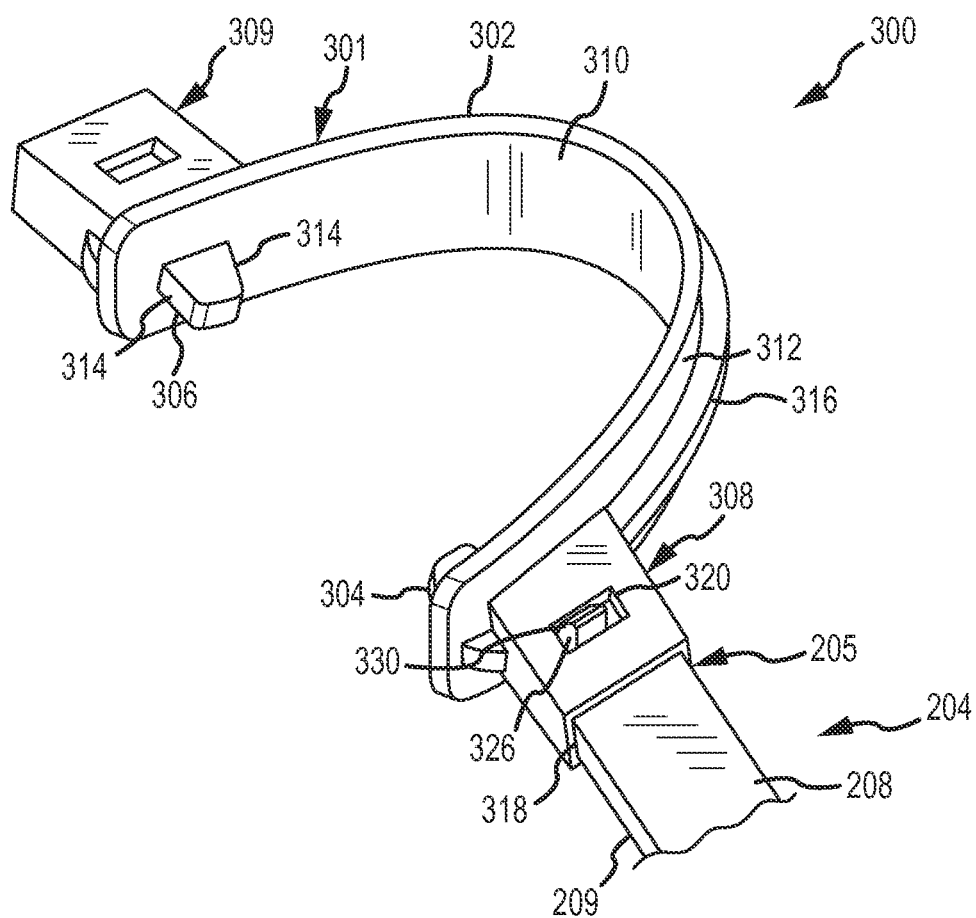
FIG. 3b illustrates the anchoring member of FIG. 3a and showing an end of the stabilizing brace being inserted into a brace engagement element of the anchoring member.

The protuberance 326 may have at least one insertion surface 330 that facilitates insertion of the protuberance 326 into the cavity 318 of the first brace engagement element 308 (e.g., where the insertion surface 330 is beveled or otherwise sloped). Furthermore, the protuberance 326 may at least partially extend above or beyond the top surface 208 of the stabilizing brace 204 for reasons that will be described below. Turning now to FIG. 3b, the anchoring member 300 is shown after insertion of the first end 205 of the stabilizing brace 204 into the cavity 318 of the first brace engagement element 308. During insertion, the insertion surface 330 initially contacts a portion of the first brace engagement element 308 which deflects the resilient arm 324 (not shown in FIG. 3b) and the protuberance 326 downward (e.g., towards the bottom surface 209) as the end 205 is inserted into the cavity 318. More specifically, after insertion and before the protuberance 326 has reached the aperture 320, the protuberance 326 is deflected such that a top surface of the protuberance 326 is essentially level with the top surface 208 of the stabilizing brace 204. Continued insertion of the first end 205 of the brace 204 into the cavity 318 results in the protuberance 326 entering (e.g., snapping into) the aperture 320 (as shown in FIG. 3b) whereby the protuberance 326 deflects upwardly so as to again protrude above the top surface 208 of the stabilizing brace 204.

At this point, the first end 205 of the stabilizing brace 204 is locked to the anchoring member 300 as an attempted removal of the stabilizing brace 204 from the cavity 318 will result in the protuberance 326 abutting an inside wall of the aperture 320 and limiting removal of the stabilizing brace 204 from the cavity 318. A similar procedure can be performed with the second end 206 of the stabilizing brace 204 to lock the second end 206 to an anchoring member 300 anchored to an adjacent support pedestal 201 to form a support structure 200 (e.g., as in FIGS. 1-2). In one variation, the first brace engagement element 308 may include a series of apertures 320 such that the protuberance 326 can be ratcheted into a desired aperture 320 which may further limit removal of the stabilizing brace 204 from the cavity 318 as the protuberance 326 would need to travel through a series of apertures 320 to be completely removed from the cavity 318. When desired, the first end 205 can be removed from the cavity 318 by inserting any appropriate tool (e.g., screwdriver) into the aperture 320 to deflect the protuberance 326 away from the aperture 320 and pulling on the stabilizing brace 204.

It should be appreciated that the cavity 318 and the spring-loaded locking member 322 can be appropriately designed in a manner that allows the resilient arm 324 and protuberance 326 to deflect upon insertion into the cavity 318. That is, the cavity 318, opening 328, etc. can be designed to allow deflection of the resilient arm 324 and protuberance 326 in the manner described above. Additionally, the first end 205 of the stabilizing brace 204 and the cavity 318 can be designed such that an end 332 (see FIG. 3a) is in contact with a back surface of the cavity 318 (e.g., a portion of the outside surface 312) when the first end 205 is locked to the anchoring member 300 (e.g., when the protuberance 326 is received in the aperture 320). In this regard, and during a seismic event, for instance, the support pedestal 201, anchoring member 300 and the stabilizing brace 204 may be able to move substantially as a single unit which may provide for a more structurally robust support structure 200.

While the first brace engagement element 308 has been shown as comprising a cavity 318 and the locking member 322 as comprising a resilient arm 324 and a protuberance 326, it is envisioned that the brace engagement element 308 and spring-loaded locking member 322 may alternatively be in the form of a resilient arm and protuberance, and a cavity 318, respectively. For example, the stabilizing brace 204 could comprise a cavity into which a protuberance and/or tab on the anchoring member 300 is inserted.

Figure 3C:
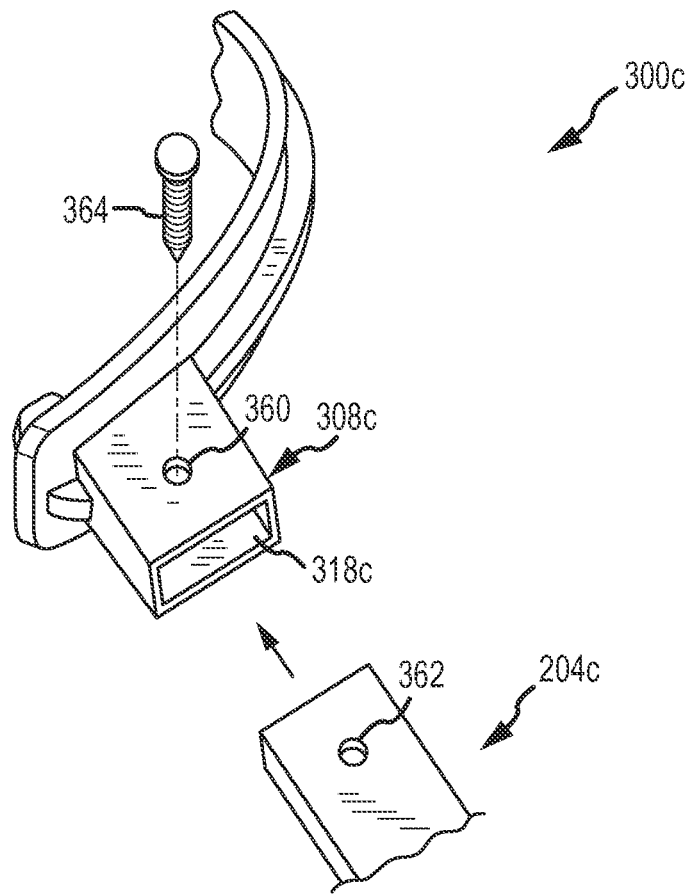
FIGS. 3c-3d illustrate alternative embodiments of brace engagement elements of an anchoring member.

The foregoing illustrates an example of one way that the stabilizing braces may be attached to the anchoring members. However, the stabilizing braces may be secured to the anchoring members in any way that securely interconnects the support pedestals and retains lateral rigidity through the structure. Thus, alternative arrangements to that illustrated in FIGS. 3a-3b are possible. For example, FIG. 3c illustrates an embodiment wherein a stabilizing brace 204c includes an aperture 362 that is adapted to line-up with an aperture 360 in the brace engagement element 308c when the brace 204c is inserted into the cavity 318c. A mechanical fastener 364 (e.g., a threaded fastener or a lock pin) may then be inserted through apertures 360 and 362 to secure the stabilizing brace 204c to the brace engagement element 308c, and hence to the anchoring member 300c.

Figure 3D:
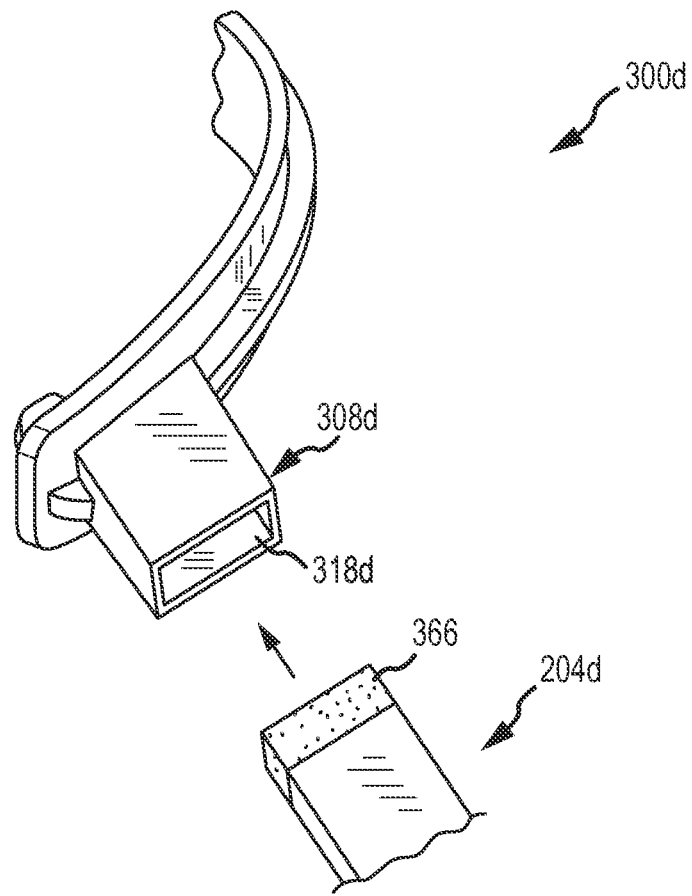

As illustrated in FIG. 3d, the stabilizing brace 204d may be inserted into the cavity 318d of the brace engagement element 308d and an adhesive 366 (e.g., an epoxy) or similar substance may be used to secure the brace 204d to the brace engagement element 308d. It will also be appreciated that combinations of the foregoing may also be used. For example, an adhesive may be used in conjunction with a mechanical fastener to secure the stabilizing brace to the brace engagement element. Other structures are also possible, such as where the stabilizing brace comprises a cavity at an end thereof that is inserted over a brace engagement element. Other means of securing the stabilizing braces to the anchoring members will be apparent to those that are skilled in the art.

Further, in an alternative embodiment, one or more of the stabilizing braces may include an anchoring member integrally (e.g., permanently) formed on one or both ends of the stabilizing brace. In this manner, the time to install the building surface assembly may be reduced by virtue of requiring fewer manual steps to assemble the support structure.

The anchoring members may be fabricated from a variety of materials and in one embodiment are fabricated from plastic to resist degradation and corrosion, such as in an exterior environment. The stabilizing braces 204 may be rigid or may be elastic and sufficiently flexible to accommodate the placement of the support structure upon uneven fixed surfaces, while maintaining sufficient lateral rigidity to rigidly interconnect the support pedestals. In any event, the stabilizing braces 204 may be fabricated from a variety of materials. For example, the stabilizing braces 204 may be fabricated from metallic or non-metallic materials, such as plastics, wood and composite materials. In one exemplary embodiment, the braces have a length of from about 1 foot to about 3 feet, and a thickness of from about ⅛" to about ¼". In some variations, the stabilizing braces 204 may be adjustable in length and in this regard may include a number of telescopic portions. For instance, the stabilizing braces 204 may be adjustable in the manner described in U.S. Patent Publication No. 2011/0011012 by Knight et al. which is incorporated herein by reference in its entirety.

Figure 4A:
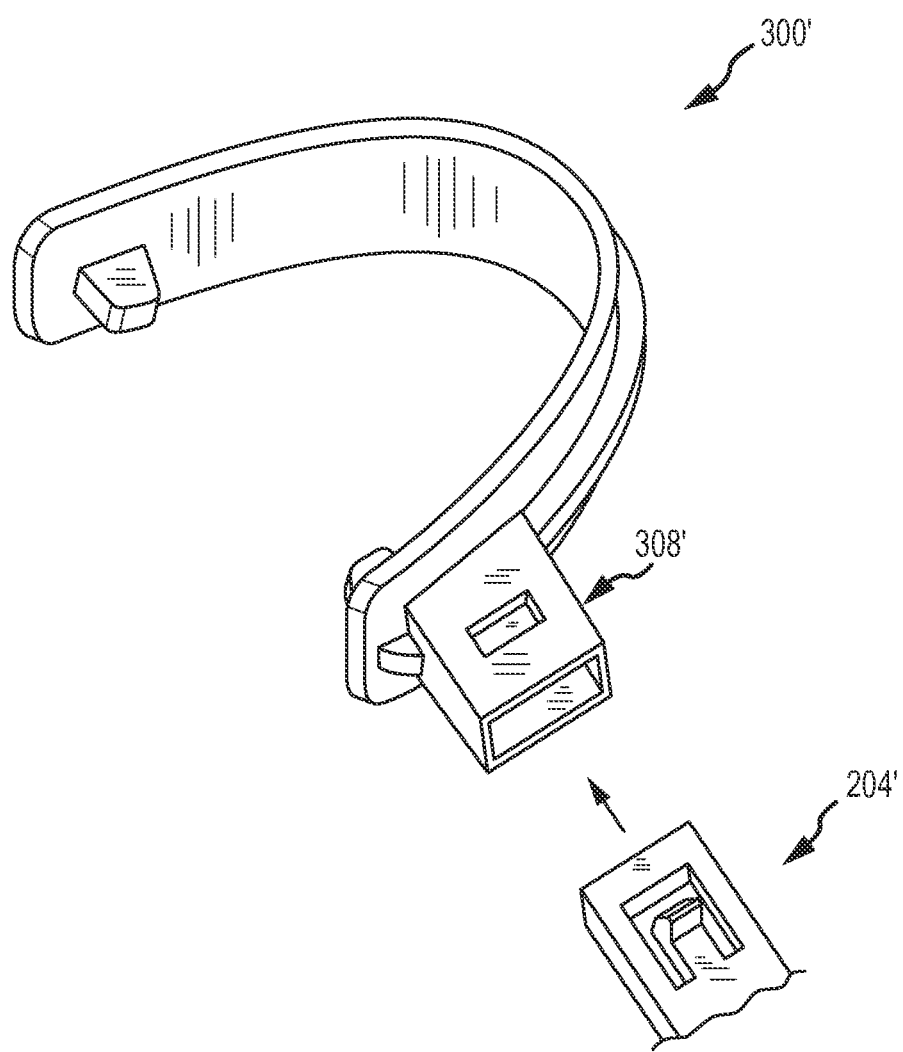
FIG. 4a illustrates another anchoring member that is adapted to interconnect stabilizing braces between the support pedestals and showing an end of a stabilizing brace being separated from the anchoring member.
Figure 4B:
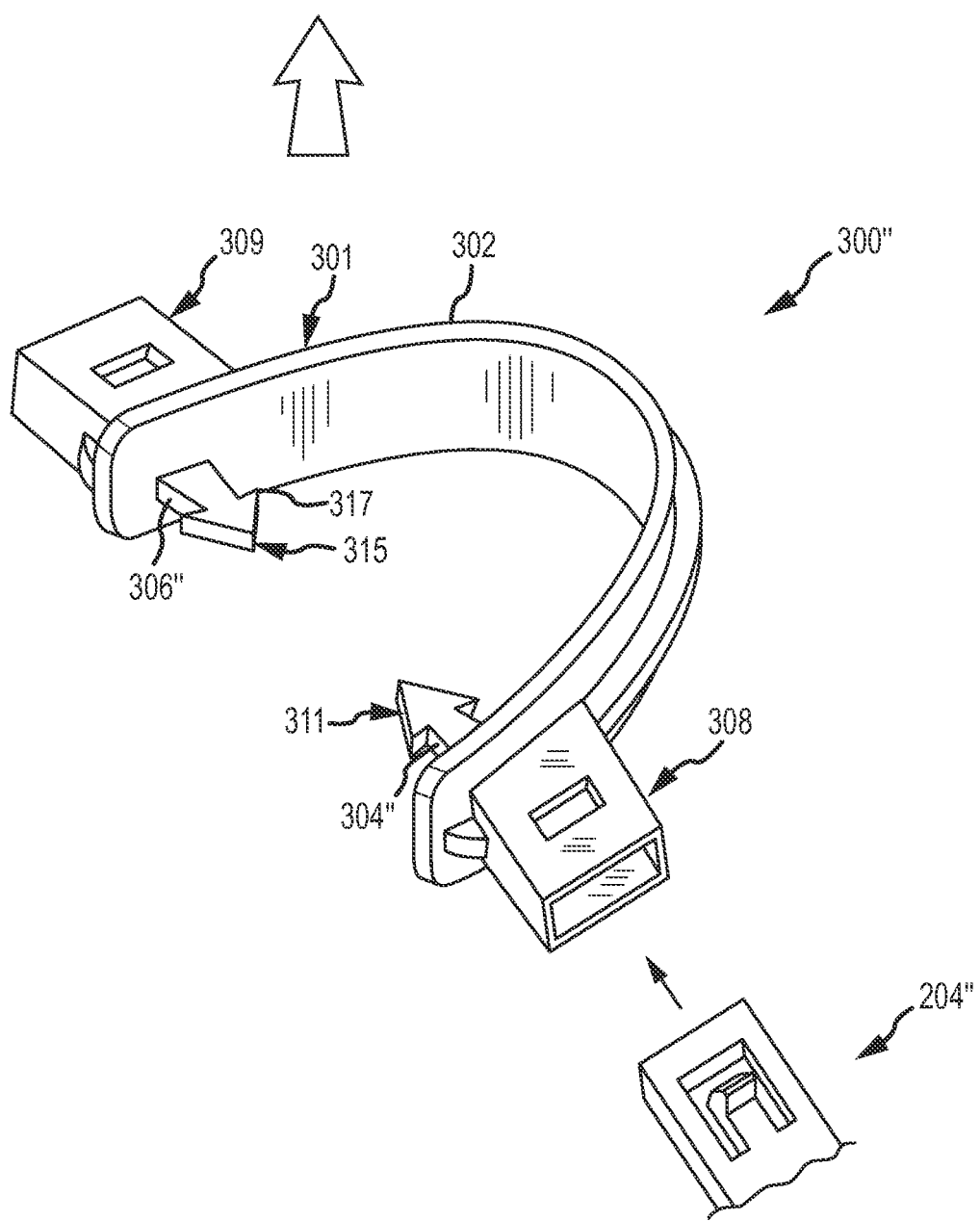
FIG. 4b illustrates another anchoring member that is adapted to interconnect stabilizing braces between the support pedestals and showing an end of a stabilizing brace being separated from the anchoring member.

Turning now to FIGS. 4a-4b, other embodiments of an anchoring member are illustrated for attaching a stabilizing brace 204 to a support pedestal 201 (e.g., as shown in FIGS. 1-2). Corresponding components between the anchoring member 300 of FIGS. 3a-3b and 4a-4b are identified by common reference numerals. The anchoring member 300' of FIG. 4a includes only a first brace engagement element 308' which may be useful in situations where only a single stabilizing brace 204' needs to be attached to a support pedestal. Anchoring members are also envisioned having more than one or two brace engagement elements. During construction of a support structure (e.g., support structure 200 of FIGS. 1-2), operators will readily understand which of the various anchoring members are needed to interconnect the various support pedestals.

With reference now to FIG. 4b, the first and second opposing attachment elements 304", 306" comprise respective first and second locking mechanisms 311, 315. The first and second locking mechanisms 311, 315 are operable to resist removal of the first and second opposing attachment elements 304", 306" from anchor engagement elements (e.g., apertures) within a support pedestal. For instance, each of the first and second locking mechanisms 311, 315 may include at least one tooth or catch 317 for contacting an inside wall of a support pedestal after the first and/or second locking mechanism 311, 315 have been inserted or introduced through an aperture of a support pedestal. For instance, the catch 317 may be resilient and may flex as it passes through the aperture and then substantially return to an initial position after reaching an interior of the central section of the support pedestal. In some arrangements, a width of the first and second locking mechanism 311, 315 may be designed to be greater than a width of the apertures that the first and second locking mechanism 311, 315 are inserted through in the support pedestal (e.g., greater than a width of apertures 232 in FIG. 6b) to resist removal of the first and second locking mechanisms 311, 315 and/or first and second opposing attachment elements 304", 306".

The locking mechanisms 311, 315 may be integral with or otherwise formed as part of the first and second opposing attachment elements 304", 306", and/or may be formed separately from the first and second opposing attachment elements 304", 306". Additionally, any appropriate number (e.g., one or more) of the locking mechanisms may be utilized at any appropriate location(s) about the anchoring member 300". Moreover, other forms of locking mechanisms are also envisioned (e.g., clips, latches). Locking mechanisms may be useful in situations where the curvilinear member 302 loses some portion of its resilient nature over time and/or otherwise loses its ability to apply a compressive force about the support pedestal to urge the first and second opposing attachment elements into apertures in the support pedestal. Such locking mechanisms may also permit brace engagement elements 308, 309 to be anchored to a support pedestal without requiring a member (e.g., curvilinear member 302) to interconnect the brace engagement elements.

Thus, stabilizing braces are utilized to interconnect a plurality of support pedestals to form a support structure that supports the surface tiles to form the elevated building surface. The support pedestals that are useful for forming the support structure can have a variety of configurations. The support pedestals can have a fixed height, or can be height-adjustable support pedestals. Further, any combination of fixed height and height-adjustable support pedestals can be used to form the support structure. The support pedestals may also be fabricated from a variety of materials. Preferably, the support pedestals are fabricated from a non-metallic material, such as plastic, that is resistant to rot and corrosion and is advantageous for use in exterior environments.

Figure 5:
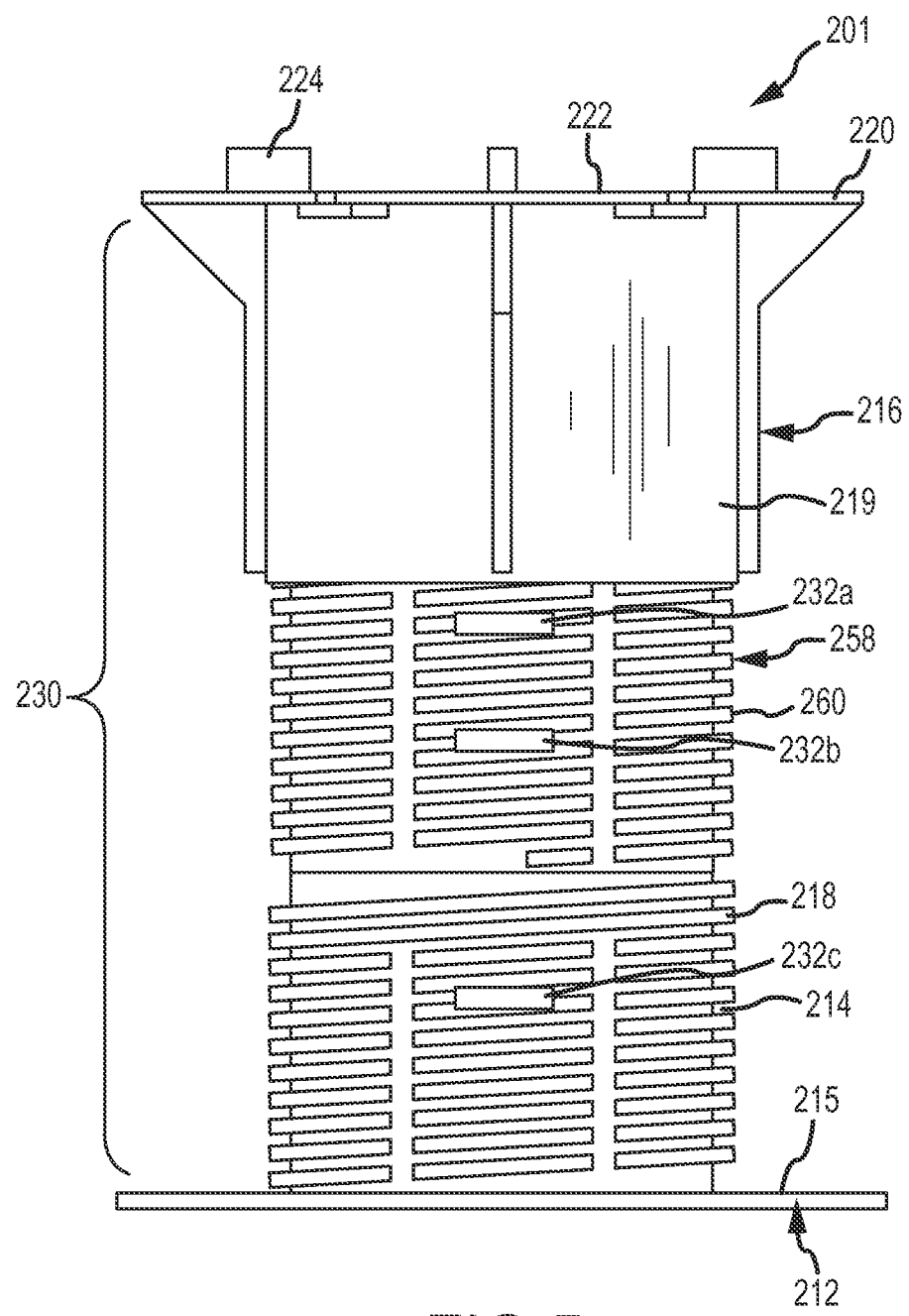
FIG. 5 illustrates a support pedestal that may be used as part of the support structure of FIGS. 1-2.

FIG. 5 illustrates a side view of an exemplary support pedestal 201 that is adapted to be placed upon a fixed surface. The support pedestal 201 illustrated in FIG. 5 is a height-adjustable support pedestal. The support pedestal 201 may broadly include a base member 212 including a base member extension 214 (e.g., a cylindrical base member extension) that extends upwardly from a base member plate 215 when the support pedestal 201 is operatively placed on a fixed surface. The base member 212 includes base member threads 218 on a surface of the base member extension 214.

A support member 216 is adapted to be operatively connected to the base member 212, either directly or through a coupling member 258 that operatively attaches the base member 212 to the support member 216. The support member 216 includes a support plate 220 and a support member extension 219 (e.g., a cylindrical support member extension) that extends downwardly from the support plate 220. The support member 216 includes support member threads (not illustrated) on an interior surface of the support member extension 219 that are adapted to threadably engage the base member threads 218 to operatively connect the support member 216 to the base member 212 and more specifically to operatively attach the support member extension 219 to the base member extension 214. Thus, the support member 216 can be mated directly to base member threads 218 and can be rotated relative to the base member 212 (or the base member 212 can be rotated relative to the support member 216) to adjust the height of the support pedestal 201. The support plate 220 is thereby disposed above the base member 212 to support building surface components (e.g., tiles) thereon. The support member threads may also be adapted to threadably engage with coupling member threads 260 to connect the support member 216 to the coupling member 258, which in turn may be operatively connected to the base member 212.

Although illustrated as having internal threads on the support member 216 and external threads on the base member 218 and coupling member 258, it will be appreciated that other configurations are possible, including external threads on the support member and internal threads on the base member. See, for example, U.S. Pat. No. 5,588,264 by Buzon and U.S. Pat. No. 6,363,685 by Kugler, each of which is incorporated herein by reference in its entirety. The support pedestal may also have a fixed height.

The support plate 220 includes a top surface 222 upon which the corners of adjacent surface tiles can be placed. Spacers 224 can be provided on the top surface 222 of the support plate 220 to provide predetermined spacing between adjacent surface tiles that form the elevated building surface. For example, the spacers 224 can be disposed on a crown member (not shown) that is placed in a recess (not shown) on the top surface 222 of the support plate 220. In this manner, the crown member can be rotated independent of the support member 216 to adjust the position of the spacers 224.

It should be appreciated from a broad perspective that the support pedestal 201 may be in the form of the base member plate 215, the support plate 220, and a support pillar or central section such as a central section 230 extending between the base member plate 215 and the support plate 220. The central section 230 may include the base member extension 214 extending away from the base plate 215 and a support member extension 219 extending away from the support plate 220. As illustrated in FIG. 5, the central section 230 also includes at least one coupling member 258 extending between the base member extension 214 and the support member extension 219 that operatively attaches the base member extension 214 to the support member extension 219 and that is adapted to increase the obtainable height of the support pedestal 201.

In another variation, the support pillar or central section may be in the form of only a single member which may be cylindrical or non-cylindrical (e.g., square-shaped cross-section). In this regard, the support pedestal 201 may have a fixed height and thus be non-adjustable. It should be appreciated that any discussion herein in relation to the central section 230 may be equally applicable to such other forms of support pillars and central sections. In any event, a distance between the base member plate 215 and the support plate 220 may be at least about 2 inches but for most applications is not greater than about 30 inches.

The central section 230 may include at least one anchor engagement element such as anchor engagement element 232b (e.g., being in the form of an aperture disposed at least partially through the central section 230) that is adapted to receive at least one of the first and second attachment elements 304, 306 of the anchoring members 300, 300', 300" (shown in FIGS. 3a-4b). For instance, the central section 230 may include a pair of anchor engagement elements (e.g., being in the form of a rectangular apertures disposed at least partially through the central section 230) that are adapted to receive the first and second opposing attachment elements 304, 306 of the anchoring members 300, 300', 300" (shown in FIGS. 3a-4b). Each pair of anchor engagement elements may include a first anchor engagement element (e.g., the upper anchor engagement element 232a shown in FIG. 5) at a first vertical position along a length of the central section 230 (e.g., above the base plate 215) and a second anchor engagement element (not shown in FIG. 5) also positioned at the first vertical position but disposed on another portion of the central section 230 (e.g., separated by about 180° from element 232a along the circumference of the central section 230, or other angular positions).

As will be discussed in relation to FIGS. 6a-6b, the anchor engagement element 232a allows an anchoring member to be anchored at a first vertical position above the base plate 215. Additional anchor engagement elements may also be formed on the central section 230 at other vertical positions above the base plate and at other angular positions along the circumference of the central section 230. For example, attachment elements 232b and 232c are disposed at second and third vertical positions above the base plate 215. Additionally, in some variations, the anchor engagement elements at a particular vertical position are separated by angles other than about 180°.

Figure 6A:
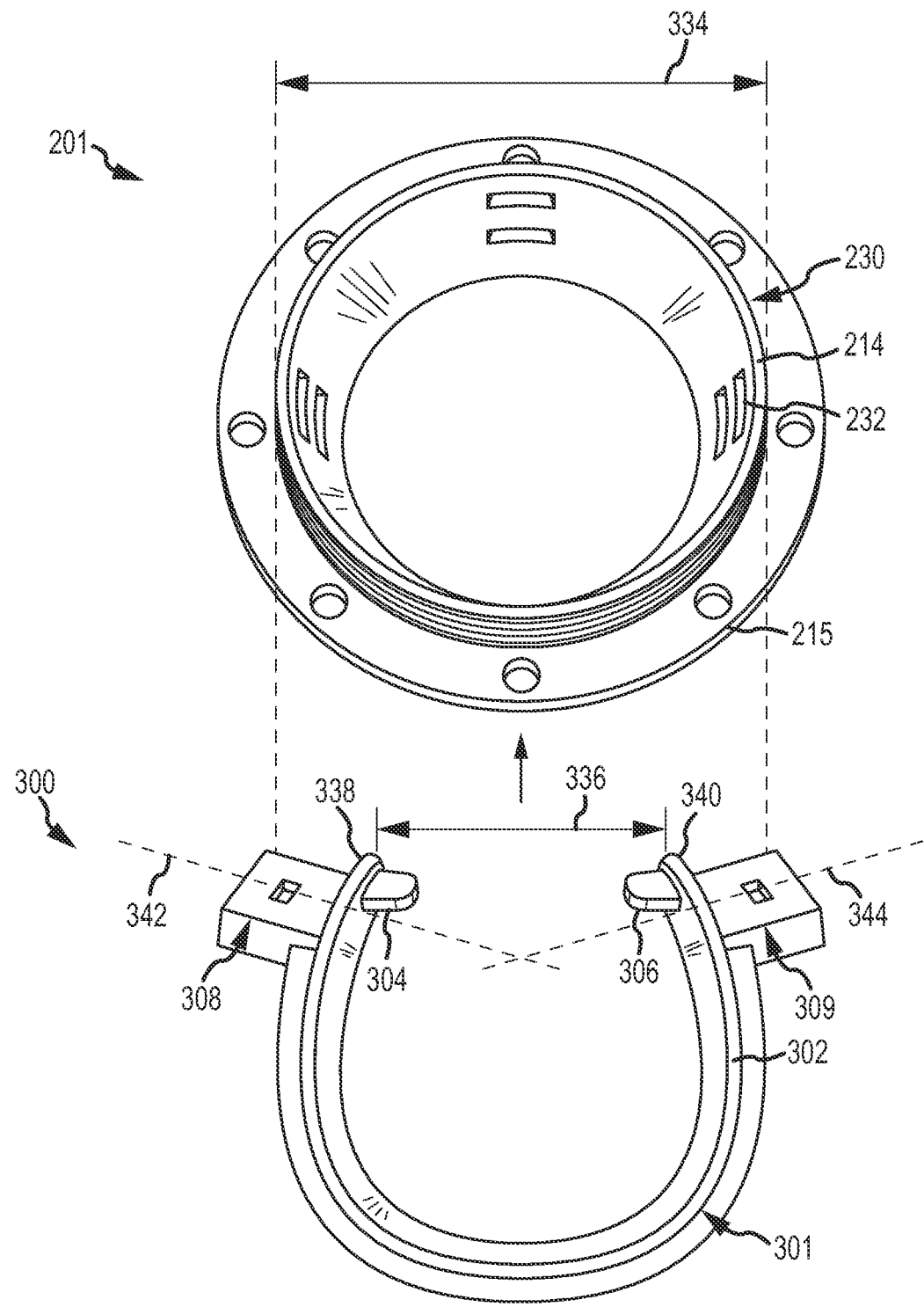
FIG. 6a illustrates the anchoring member of FIG. 3a before being anchored to a support pedestal.

Turning now to FIG. 6a, a top perspective view of a support pedestal 201 and anchoring member 300 are shown before the anchoring member 300 has been anchored to the central section 230 of the support pedestal. For clarity, the support member 216 and coupling member 258 (shown in FIG. 5) have been removed. As illustrated, the central section 230 of the support pedestal 201 may be cylindrical and include a diameter 334 (e.g., an outside diameter). Additionally, an anchoring member gap 336 may be defined between first and second ends 338, 340 of the curvilinear member 302. The state of the curvilinear member 302 illustrated in FIG. 6a may be considered a "first state", and the anchoring member gap 336 comprises a first distance in this first state that is less than the diameter 334 of the central section 230. In this regard, it should be appreciated that the first and second ends 338, 340 generally should be separated from each other to allow the curvilinear member 302 to be mounted onto the central section 230.

Another observation is that the first and second brace engagement elements 308, 309 may include different first and second insertion axes 342, 344 when the anchoring member is in this first state. As seen in FIG. 6a, the insertion axes 342, 344 are non-collinear and generally converge in a direction towards a center of the curvilinear member 302. As will be appreciated, the non-collinear nature of the first and second insertion axes 342, 344 in this first state of the curvilinear member 302 allows the first and second insertion axes 342, 344 to become substantially collinear when the first and second ends 338, 340 are spread apart and the curvilinear member 302 is mounted (e.g., compressively) about the central section 230 of the support pedestal 201.

Figure 6B:
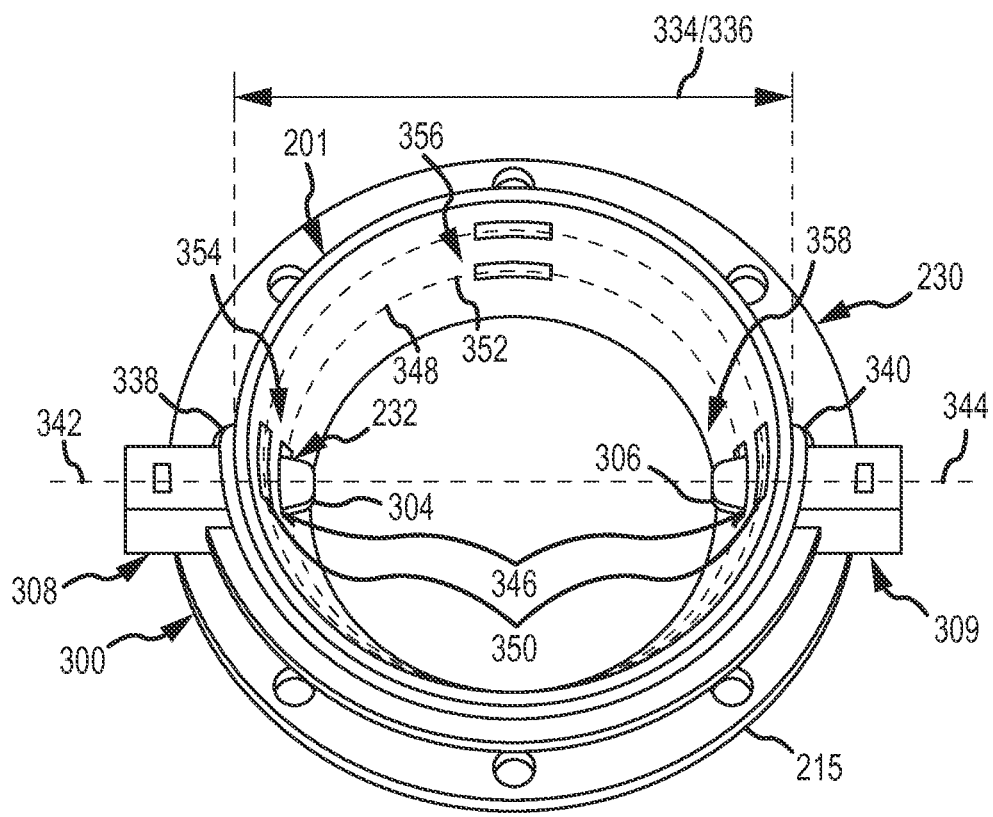
FIG. 6b illustrates the anchoring member of FIG. 3a after being anchored to a support pedestal.

Turning now to FIG. 6b, the curvilinear member 302 has been mounted on the central section 230 and has been moved to another "state". In this second state, the diameter 334 and the anchoring member gap 336 are approximately equal. Stated otherwise, the central section 230 in this state is disposed within the anchoring member gap 336. As will be appreciated, the anchoring member gap 336 has a second distance in the second state that is greater than the first distance in the first state. This results from deflection of the first and second ends 338, 340 of the curvilinear member 302 away from each other during mounting of the curvilinear member 302 about the central section 230 of the support pedestal 201. Of course, additional states of the curvilinear member 302 whereby the anchoring member gap 336 is of different distances can be achieved. For instance, an operator may deflect the first and second ends 338, 340 such that the anchoring member gap 336 is of a distance greater than the diameter 334 of the central section 230 to allow the anchoring member 300 to be removed from the support pedestal 201. It should be appreciated that any of the various states of the curvilinear member 302 could be considered the "first state," "second state," etc. depending upon an initial, starting state of the curvilinear member 302. It should also be appreciated that the flexible compressive nature (e.g., resilient nature) of the anchoring member 300 allows the anchoring member 300 to be used with support pedestals 201 of varying diameters.

Additionally, deflection of the first and second ends 338, 340 away from each other causes the first and second insertion axes 342, 344 of the first and second brace engagement elements 308, 309 to at least substantially align or otherwise be least substantially collinear. This allows first and second opposing stabilizing braces separated by about 180° to be attached to opposing sides of the support pedestals 201 (e.g., see support pedestal 201a in FIG. 1 and opposing braces 204b and 204c). It is contemplated that the anchoring member 300 could be designed such that the first and second insertion axes 342, 344 are non-collinear even in this state which may allow stabilizing braces disposed at angles other than about 180° relative to each other to be attached to a support pedestal. Additionally, in the case where the mounting member 301 is generally not resilient and is operable to be mechanically fixed to the central section of the support pedestal 201, the first and second insertion axes 342, 344 may always be substantially aligned, or may always be in the same non-collinear relationship to each other.

With continued reference to FIG. 6b, the central section 230 may include at least one pair of anchor engagement elements 232, a first of which may be disposed on one portion of the central section 230 and a second of which may be disposed on an opposing portion of the central section 230 (e.g., separated by about 180°). For instance, the central section 230 may include a first pair 346 of anchor engagement elements disposed at a first vertical position 348 above the base plate 215 and a second pair 350 of anchor engagement elements disposed at a second vertical position 352 above the base plate 215. Additionally, the anchor engagement elements of the first and second pairs 346, 350 (and/or other pairs) need not necessarily be disposed at the same angular position along the circumference of the central section 230. For instance, while the first anchor engagement elements 232 of the first and second pairs 346, 350 have been illustrated as being generally disposed at a first angular position 354 on the circumference of the central section 230, the first anchor engagement element 232 of one of the first and second pairs 346, 350 could be disposed at a second angular position 356 (e.g., separated by about 90° from the first angular position 354).

As illustrated, the first and second attachment elements 304, 306 (e.g., lugs) have been respectively engaged in the first pair 346 of anchor engagement elements 232 (e.g., anchor engagement apertures). In this manner, movement of the anchoring member 300 relative to the central section 230 (e.g., vertical movement or rotational movement) may be inhibited. Installation of the anchoring member 300 onto the central section 230 may occur in numerous manners. For instance, an operator can initially engage one of the first and second opposing attachment elements 304, 306 of the curvilinear member 302 with a first anchor engagement element 232 of one pair of anchor engagement elements 232 (e.g., locate one of the lugs on the anchoring member 300 into one of the apertures on the central section 230). Thereafter, the operator can wrap the other end of the curvilinear member 302 around the central section 230 and locate (e.g., snap) the other of the first and second opposing attachment elements 304, 306 into a corresponding second anchor engagement element 232 of the pair of anchor engagement elements 232. It will be appreciated that as the gap 336 is initially less than the diameter 334 (e.g., as shown in FIG. 6a), the curvilinear member 302 may need to be flexed or deflected (e.g., such that the first and second ends 338, 340 move apart from each other) to allow the other of the first and second opposing attachment elements 304, 306 to be engaged into the corresponding second anchor engagement element.

The tendency of the curvilinear member 302 to return to the first state (shown in FIG. 6a) due to the resilient nature of the curvilinear member 302 serves to resist disengagement of the first and second opposing attachment elements 304, 306 from the anchor engagement elements. In other words, the compressive nature of the curvilinear member 302 helps to maintain positioning of the anchoring member 300 on the central section 230 of the support pedestal. As discussed previously, the anchoring member 300 may be equipped with locking mechanisms (e.g., first and or second locking mechanism 311, 315 in FIG. 6b) for further resisting disengagement of the first and second opposing attachment elements 304, 306 from the pair of anchor engagement elements 232. Once (or even before) the anchoring member 300 has been anchored to the central section 230, one or more stabilizing braces 204 can be engaged with the first and/or second brace engagement elements 308, 309 (e.g., as shown in FIG. 3a) as part of the construction of a support structure (e.g., support structure 200 shown in FIG. 2). After a plurality of adjacent support pedestals 201 have been interconnected via anchoring members 300 and stabilizing braces 204, any appropriate building surface components (e.g., tiles, pavers) can be placed on top of the support pedestals (e.g., over the support plate 220 shown in FIG. 5) to form an elevated building surface (e.g., building surface 101 shown in FIG. 1). Removal of the anchoring member 300 from the support pedestal 201 may be achieved by, for instance, grasping one of the first and second brace engagement elements 308, 309 and pulling in a direction away from the central section 230 so as to withdraw the corresponding first or second opposing attachment element 304, 306 out of the corresponding anchor engagement element 232. This may entail disengaging any locking mechanisms present between the central section 230 and the anchoring member 300.

In one arrangement, a second anchoring member may be disposed at a different vertical position along the length of the central section 230 in relation to the first anchoring member 300. For instance, the first and second brace engagement elements 308, 309 of the first and second anchoring members may be separated by about 90° which may allow a single support pedestal (e.g., support pedestal 201*i* in FIG. 2) to be interconnected to four adjacent support pedestals via four different stabilizing braces 204. Alternatively, the first brace engagement elements 308 of the first and second anchoring members could be at the same angular position (e.g., first angular position 354) and the second brace engagement elements 309 of the first and second anchoring members could be at the same angular position (e.g., a third angular position 358 in FIG. 6*b*). This may allow a single support pedestal to be interconnected to each of two adjacent support pedestals by two stabilizing braces. As will be appreciated, the support pedestal 201 acquires a higher center of gravity when a cylindrical coupling member is used as part of the central section 230. In this regard, at least one anchoring member may be disposed about the coupling member and another anchoring member may be disposed about the base member extension (e.g., base member extension 214 in FIG. 5) to interconnect the support pedestals 201.

Figure 7:
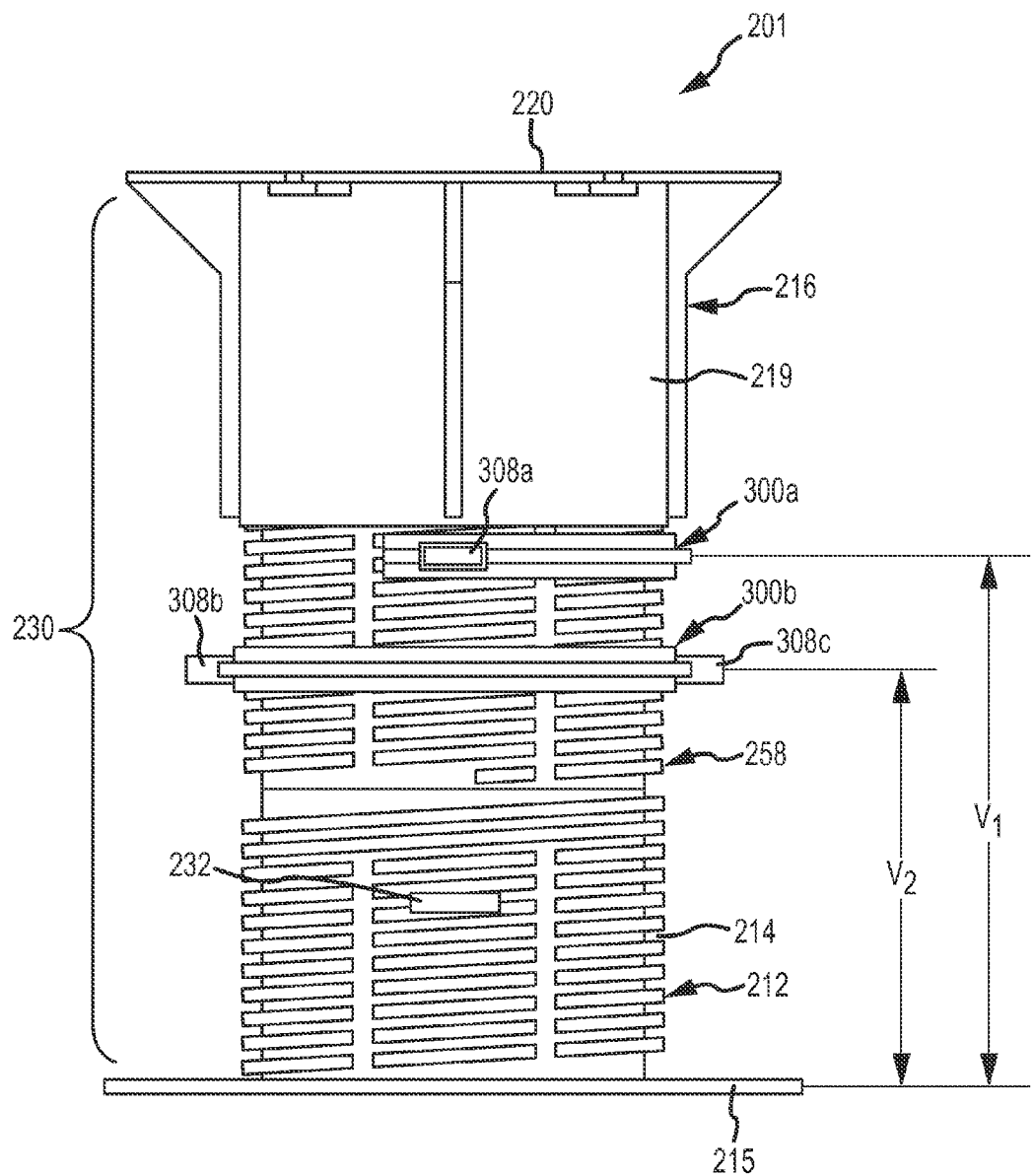
FIG. 7 illustrates a support pedestal having two anchoring members anchored to a central section of the support pedestal.

FIG. 7 illustrates a side view of a support pedestal 201 having a first anchoring member 300*a* and a second anchoring member 300*b* attached to a central section 230 of the support pedestal 201. As illustrated in FIG. 7, the central section 230 extends between the base member plate 215 and the support plate 220 and includes a base member extension 214, a support member extension 219 and a coupling member 258 coupling the base member 212 to the support member 216.

The first anchoring member 300*a* is anchored to the central section 230 at a first vertical position $V_1$ above the base plate 215. The first vertical position $V_1$ is below the support plate 220 and as illustrated in FIG. 7 is located on the coupling member 258. The first anchoring member 300*a* includes a brace engagement element 308*a* that is adapted to engage a stabilizing brace with the anchoring member 300*a*. As illustrated in FIG. 7, brace engagement element 308*a* is adapted to engage a stabilizing brace that would come out of FIG. 7 (e.g., perpendicular to the plane of the sheet illustrating FIG. 7).

The second anchoring member 300*b* is also anchored to the central section 230 of the support pedestal 201, but at a second vertical position $V_2$ that is different (i.e., lower) than the first vertical position $V_1$. The second anchoring member 300*b* includes a first brace engagement element 308*b* and a second brace engagement element 308*c* that are separated about 180° along the circumference of the central section 230 from the first brace engagement element 308*b*. In this manner, stabilizing braces may be secured to the anchoring member 300*b* at brace engagement elements 308*b*, 308*c* such that the stabilizing braces may interconnect to support pedestals placed at either side (e.g., left and right) of the support pedestal 201. Further, each of the brace engagement elements 308*b*, 308*c* are separated by about 90° from the brace engagement element 308*a* along the circumference of the central section 230.

The first anchoring member 300*a* and the second anchoring member 300*b* are anchored to the central section 230 through anchor engagement elements (not visible), similar to anchor engagement element 232 that is disposed on the base member extension 214.

Figure 8:
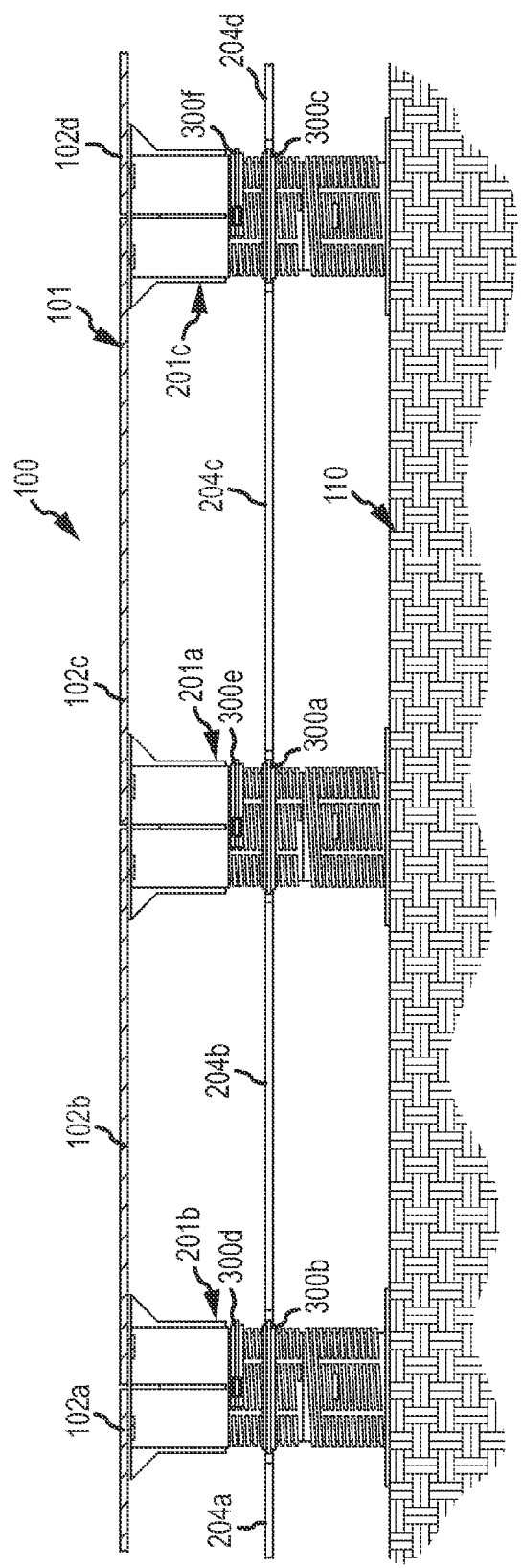
FIG. 8 illustrates a side view of a stabilized elevated building surface assembly.

FIG. 8 illustrates a side view of a stabilized elevated building surface structure 100 that includes a building surface 101 that includes a plurality of surface tiles 102*a*-102*d*. The structure 100 includes a plurality of spaced-apart support pedestals 201*a*-201*c* disposed upon a fixed surface 110. A plurality of stabilizing braces 204*a*-204*d* interconnects the support pedestals 201*a*-201*c*. The stabilizing braces 204*a*-204*d* are attached to the support pedestals 201*a*-201*c* by anchoring members 300*a*-300*c* and the stabilizing braces 204*a*-204*d* are disposed generally horizontally and substantially parallel with the fixed surface 110.

The structure 100 also includes a plurality of anchoring members 300*d*-300*f* that are anchored to the support pedestals 201*a*-201*c* at a vertical position above the base plates that is different than (e.g., higher than) the vertical position of the anchoring members 300*a*-300*c*. The anchoring members 300*d*-300*f* are adapted to attach stabilizing braces that are disposed substantially orthogonally in relation to stabilizing braces 204*a*-204*d*.

While various embodiments of the present invention have been described in detail, it is apparent that modifications and adaptations of those embodiments will occur to those skilled in the art. For instance, while the anchor engagement elements 232 have been illustrated as apertures and the opposing attachment elements 304, 306 have been illustrated in the form of lugs, the structures could be reversed such that anchor engagement elements 232 are in the form of lugs and the opposing attachment elements 304, 306 are in the form of apertures. Additionally, other arrangements such as aligned apertures and threaded fasteners, flexible tabs and the like are also envisioned. As an additional example, while the braces 204 have been illustrated in FIGS. 1-2 as being generally horizontal, it is also contemplated that the anchoring members 300 could be designed to allow the braces 204 to be disposed other than horizontal. Further, one or more portions of the anchoring members (e.g., the brace engagement elements) could be an integral portion of the central section or pillar of the support pedestals. However, it is to be expressly understood that such modifications and adaptations are within the spirit and scope of the present invention.

What is claimed is:

1. A support structure for elevating a building surface above a fixed surface, the support structure comprising:
   a plurality of support pedestals disposed in spaced-apart relation, the support pedestals comprising:
      a base plate that is adapted to be placed on the fixed surface;
      a support plate that is adapted to support a building surface component;
      a central section extending between the base plate and the support plate; and
      at least a first anchor engagement element disposed on the central sections of the support pedestals;
   a plurality of anchoring members, the anchoring members comprising a mounting member having opposed inner and outer surfaces, and first and second ends defining an anchoring member gap therebetween, wherein the central sections of the support pedestals are disposed within the anchoring member gaps, wherein the mounting members are resiliently movable between at least first and second states, wherein the anchoring member gaps are greater in the second state than in the first state, and whereby the anchoring members may be detached from the central sections in the second state; at least a first attachment element integrally formed with the mounting member and extending inwardly from the inner surface, and at least a first brace engagement element extending outwardly from the outer surface, where the first attachment elements are engaged with the first anchor engagement elements of the support pedestals to anchor the anchoring members to the support pedestals; and
   a stabilizing brace operatively attached to at least first and second adjacent support pedestals, wherein a first end of the stabilizing brace is received within a cavity of the first brace engagement element of a first anchoring member of the first support pedestal and secured thereto via a spring-loaded locking member of the first brace engagement element or the first end of the stabilizing brace, and wherein a second end of the stabilizing brace is received within a cavity of the first brace engagement element of a second anchoring member of the second support pedestal and secured thereto via a spring-loaded locking member of the first brace engagement element or the second end of the stabilizing brace.

2. The support structure as recited in claim 1, wherein the mounting members are resilient.

3. The support structure as recited in claim 1, wherein the mounting members are curvilinear.

4. The support structure as recited in claim 1, wherein the mounting members are non-curvilinear shaped.

5. The support structure as recited in claim 4, wherein the non-curvilinear shape comprises a square or at least partial hexagonal shape.

6. The support structure as recited in claim 1, wherein the mounting members are compressively engaged and mounted on the central sections of the support pedestals.

7. The support structure as recited in claim 1, wherein an inner surface of the mounting members contacts the central sections of the support pedestals.

8. The support structure as recited in claim 1, wherein the anchoring members further comprise at least a second attachment element integrally formed with the mounting member and extending inwardly from the inner surface and that is engaged with a second anchor engagement element disposed on the central sections.

9. The support structure as recited in claim 8, wherein the first and second anchor engagement elements are separated by about 45° or more along a circumference of the central sections.

10. The support structure as recited in claim 8, wherein the first and second anchor engagement elements are separated by about 90° or more along a circumference of the central sections.

11. The support structure as recited in claim 8, wherein the first anchor engagement elements comprise apertures.

12. The support structure as recited in claim 11, wherein the first attachment elements comprise lugs that are adapted to be received in the anchor engagement apertures.

13. The support structure as recited in claim 8, wherein the support pedestals further comprise at least third and fourth anchor engagement elements disposed on the central sections, wherein the first and second anchor engagement elements are disposed at a first vertical position above the base plates and the third and fourth anchor engagement elements are disposed at a second vertical position above the base plates that is different than the first vertical position.

14. The support structure as recited in claim 1, wherein the anchoring members further comprise a second brace engagement element, wherein the second brace engagement elements are adapted to engage with the first or second end of the stabilizing brace.

15. The support structure as recited in claim 1, wherein the first brace engagement elements comprise a tab extending outwardly from the anchoring members.

16. The support structure as recited in claim 1, wherein the central sections of the support pedestals comprise:
a base member extension extending away from the base plates; and
a support member extension extending away from the support plates, wherein the support member extensions are operatively attached to the base member extensions.

17. The support structure as recited in claim 16, wherein the base member extensions and the support member extensions are cylindrical.

18. The support structure as recited in claim 16, wherein the central sections further comprise a coupling member extending between the base member extension and the support member extension, wherein the coupling members operatively attach the base member extensions to the support member extensions.

19. The support structure as recited in claim 1, wherein the stabilizing brace has an adjustable length.

20. The support structure as recited in claim 1, wherein the stabilizing brace has a fixed length.

21. The support structure as recited in claim 1, wherein the stabilizing brace comprises a material selected from the group consisting of plastic, metal and composites.

22. The support structure as recited in claim 1, wherein the support pedestals comprise plastic.

23. The support structure as recited in claim 1, wherein the stabilizing brace is disposed generally horizontally relative to the fixed surface.

24. A support structure for elevating a building surface above a fixed surface, the support structure comprising:
a plurality of support pedestals disposed in spaced-apart relation on the fixed surface, the support pedestals comprising:
a base plate;
a support plate;
a central section extending between the base and support plates; and
a plurality of apertures disposed on the central sections;
a plurality of anchoring members that are removably anchored to the apertures on the central sections of the support pedestals, the anchoring members comprising: a mounting member including first and second ends defining an anchoring member gap therebetween, wherein the central sections of the support pedestals are disposed within the anchoring member gaps, wherein the mounting members are resiliently movable between at least first and second states, wherein the anchoring member gaps are greater in the second state than in the first state, and whereby the anchoring members may be detached from the central sections in the second state, and; a plurality of lugs integrally formed with the mounting member, the lugs being received within the apertures in a direction substantially perpendicular to a central axis of the support pedestals to anchor the anchoring members to the support pedestals; and
a stabilizing brace operatively attached to at least a first and a second of the plurality of support pedestals, wherein a first end of the stabilizing brace is secured to a first anchoring member anchored to the first support pedestal and a second end of the stabilizing brace is secured to a second anchoring member anchored to the second support pedestal.

25. The support structure as recited in claim 24, wherein the plurality of apertures comprises at least a first aperture and a second aperture that are each disposed at substantially the same vertical position above the base plates and are separated by about 45° or more along a circumference of the central sections.

26. The support structure as recited in claim 24, wherein the plurality of apertures comprises at least a first aperture and a second aperture that are disposed at substantially the same vertical position above the base plates and are separated by about 90° or more along a circumference of the central sections.

27. The support structure as recited in claim 24, wherein the plurality of apertures comprise at least a first aperture that is disposed at a first vertical position above the base plates and at least a second aperture that is disposed at a second vertical position above the base plates that is different than the first vertical position.

28. The support structure as recited in claim 24, wherein the first and second anchoring members are anchored to the first support pedestal and the second support pedestal respectively at a first vertical position above the base plates, and wherein at least third and fourth anchoring members are anchored to the first support pedestal and the second support pedestal respectively at a second vertical position above the base plates that is different than the first vertical position, and wherein a first end of a second stabilizing brace is operatively attached to the first anchoring member anchored to the first support pedestal and a second end of the second stabilizing brace is operatively attached to an anchoring member anchored to a third support pedestal.

29. The support structure as recited in claim 24, wherein the central sections of the plurality of support pedestals comprise a base member extension extending away from the base plate and a support member extension extending away from the support plate that is operatively attached to the base member extension.

30. The support structure as recited in claim 29, wherein the central sections of the plurality of support pedestals further comprise a coupling member operatively attaching the base member extensions and the support member extensions, and wherein the first and second anchoring members are anchored to the coupling members of the first and second support pedestals respectively.

31. The support structure as recited in claim 24, wherein the anchoring members are compressively engaged and mounted onto the central sections of the support pedestals.

32. The support structure as recited in claim 28, wherein the lugs are disposed proximate the first and second ends of the mounting member.

33. A support structure for elevating a building surface above a fixed surface, the support structure comprising:
- a plurality of support pedestals disposed in spaced-apart relation, the support pedestals comprising:
  - a base plate that is adapted to be placed on the fixed surface;
  - a support plate that is adapted to support a building surface component;
  - a central section extending between the base plate and the support plate; and
  - a plurality of anchor engagement element disposed on the central sections of the support pedestals;
- a plurality of anchoring members anchored to the support pedestals, wherein the anchoring members comprise a mounting member having first and second ends defining an anchoring member gap therebetween and a plurality of attachment elements extending inwardly from an inner surface of the mounting member, wherein the central sections of the support pedestals are disposable within the anchoring member gaps, wherein the mounting members are resiliently movable between at least first and second states, wherein the anchoring member gaps comprise a first distance that is less than a diameter of the central section in the first state, wherein the anchoring member gaps comprise a second distance that is greater than the first distance in the second state, and wherein the plurality of attachment elements are respectively engaged with the plurality of anchor engagement elements in the second state; and
- a stabilizing brace attachable to at least first and second adjacent support pedestals, wherein a first end of the stabilizing brace is securable to a first anchoring member anchored to the first support pedestal, and a second end of the stabilizing brace is securable to a second anchoring member anchored to the second support pedestal.

34. The support structure of claim 33, wherein the first state comprises a relaxed state of the mounting member.

35. The support structure of claim 34, wherein the second state comprises a deflected state of the mounting member.

36. The support structure of claim 33, wherein the mounting members are resiliently movable into a third state, wherein the anchoring member gaps comprise a third distance that is greater than the second distance in the third state, and wherein the anchoring members are removable from the central sections in the third state.

37. The support structure of claim 33, wherein the attachment elements comprise lugs integrally formed with the mounting member.

* * * * *